United States Patent [19]
Swenson et al.

[11] Patent Number: 5,490,097
[45] Date of Patent: Feb. 6, 1996

[54] SYSTEM AND METHOD FOR MODELING, ANALYZING AND EXECUTING WORK PROCESS PLANS

[75] Inventors: Keith D. Swenson; Robin J. Maxwell, both of San Jose, Calif.

[73] Assignee: Fujitsu Limited, Japan

[21] Appl. No.: 103,066

[22] Filed: Aug. 6, 1993

Related U.S. Application Data

[63] Continuation-in-part of Ser. No. 35,381, Mar. 22, 1993, abandoned.

[51] Int. Cl.⁶ .................................................. G06F 17/60
[52] U.S. Cl. .................... 364/578; 364/468; 364/DIG. 1; 364/DIG. 2; 364/222.1; 364/227.4; 364/916.3; 364/916.4; 395/500
[58] Field of Search ................................... 364/468, 578; 395/500

[56] References Cited

U.S. PATENT DOCUMENTS

| | | | |
|---|---|---|---|
| 4,631,664 | 12/1986 | Bachman | 364/DIG. 1 |
| 4,796,194 | 1/1989 | Atherton | 364/468 |
| 5,016,170 | 5/1991 | Pollalis et al. | 364/401 |
| 5,077,661 | 12/1991 | Jain et al. | 364/402 |
| 5,140,537 | 8/1992 | Tullis | 364/578 |
| 5,146,591 | 9/1992 | Bachman et al. | 395/600 |
| 5,161,211 | 11/1992 | Taguchi et al. | 395/10 |
| 5,179,698 | 1/1993 | Bachman et al. | 395/600 |
| 5,193,182 | 3/1993 | Bachman et al. | 395/600 |
| 5,193,183 | 3/1993 | Bachman | 395/600 |
| 5,195,178 | 3/1993 | Krieger et al. | 395/157 |
| 5,208,748 | 5/1993 | Flores et al. | 364/419 |
| 5,208,765 | 5/1993 | Turnbull | 364/552 |
| 5,212,771 | 5/1993 | Gane et al. | 395/160 |
| 5,216,603 | 6/1993 | Flores et al. | 364/419 |
| 5,241,465 | 8/1993 | Oba et al. | 364/401 |
| 5,357,439 | 10/1994 | Matsuzaki et al. | 364/468 |

OTHER PUBLICATIONS

M. Baldassari, V. Berti and G. Bruno, "Object–Oriented Conceptual Programming Based on PROT Nets", Dipartimento di Automatica e Informatica (Italy), pp. 226–233 (CH2647–6/88/0000/0226$01.00©1988 IEEE).

J. Bowers and J. Churchcer, "Local and Global Structuring of Computer Mediated Communication: Developing Linguistic Perspectives on CSCW in COSMOS", Association for Computing Machinery, Inc. *Conference on Computer–Supported Cooperative Work*, (Sep. 1988) pp. 125–139.

Cap Gemini Innovation (France), "PROCESS WEAVER General Information Manual", Version PW1.0 (©1992).

F. De Cindio, G. De Michelis, and C. Simone, "The Communication Disciplines of CHAOS", *Concurrency and Nets*, (1988) pp. 115–139.

E. P. Glinert, and S. L. Tanimoto, "Pict: An Interactive Graphical Programming Environment", *Computer*, (Nov. 1984) pp. 7–25.

(List continued on next page.)

*Primary Examiner*—Edward R. Cosimano
*Attorney, Agent, or Firm*—Christie, Parker & Hale

[57] ABSTRACT

A method of using a computer system to model work processes that allows access by multiple users and dynamic modification the work process model. The method defines a plurality of tasks that are completed in the course of completing the work process. For each of the tasks, a set of expected courses of action performed in completing the task is defined. For each of the expected courses of action, one or more obligations that must be fulfilled upon the performance of such expected courses of action are associated with the expected courses of action. The method also included associating obligations with the activation of one or more of other tasks. The method tracks the activation and completion of the tasks. After the activation and completion of the tasks begins, tasks, expectations and obligations may be modified or added.

26 Claims, 17 Drawing Sheets

Microfiche Appendix Included
(195 Microfiche, 2 Pages)

OTHER PUBLICATIONS

Y. Goldberg, M. Safran, W. Silverman and E. Shapiro, "Active Mail: A Framework for Integrated Groupware Applications", *Groupware '92* (1992) pp. 222–224.

D. Harel, "On Visual Formalisms", *Communications of the ACM*, vol. 31, No. 5 (May 1988) pp. 514–530.

D. Harel, H. Lachover, A. Naamad, A. Pnueli, M. Politi, R. Sherman, A. Shtull–Trauring and M. Trakhtenbrot, "STATEMATE: A Working Environment for the Development of Complex Reactive System", *IEEE Transactions on Software Engineering*, vol. 16, No. 4 (Apr. 1990) pp. 403–413.

A. W. Holt, "Diplans: A New Language for the Study and Implementation of Coordination", *ACM Transactions on Office Information Systems*, vol. 6, No. 2 (Apr. 1988) pp. 109–125.

G. S. Hura, M. A. Costarella, C. G. Buell, and M. M. Cvetanovic, "PNSOFT: A Menu–Driven Software Package for Petri–Net Modeling and Analysis", Wright State University Dayton, Ohio, pp.: 41–47 (CH2647–6/88/0000/0041$01.00©1988 IEEE).

R. J. K. Jacob, "A State Transition Diagram Language for Visual Programming", *Computer*, (Aug. 1985) pp. 51–59.

H. Krasner, J. McInroy and D. B. Walz, "Groupware Research and Technology Issues with Application to Software Process Management", *IEEE Transactions on Systems, Man, and Cybernetics*, vol. 21, No. 6 (Jul./Aug. 1991) pp. 704–712.

R. Medina–Mora, T. Winograd, R. Flores and F. Flores, "The Action Workflow Approach to Workflow Management Technology", *CSCW 92 Proceedings*, (Nov. 1992) pp. 1–8.

S. K. Sarin, K. R. Abbott and D. R. McCarthy, "A Process Model and System for Supporting Collaborative Work", pp. 213–224 (1991 ACM 0–89791–456–2/91/0010/0213 . . . $1.50).

A. Shepard, N. Mayer, and A. Kuchinsky, "Strudel–An Extensible Electronic Conversation Toolkit", Association for Computing Machinery, Inc., *Conference on Computer–Supported Cooperative Work*, (Oct. 1990) pp. 93–104.

M. D. Zisman, "Representation, Specification and Automation of Office Procedures", Ph.D. Dissertation, University of Pennsylvania (1977), UMI Dissertation Services (78–6664).

Documentation for TCL, Version 6.7, Sun Release 4.1.

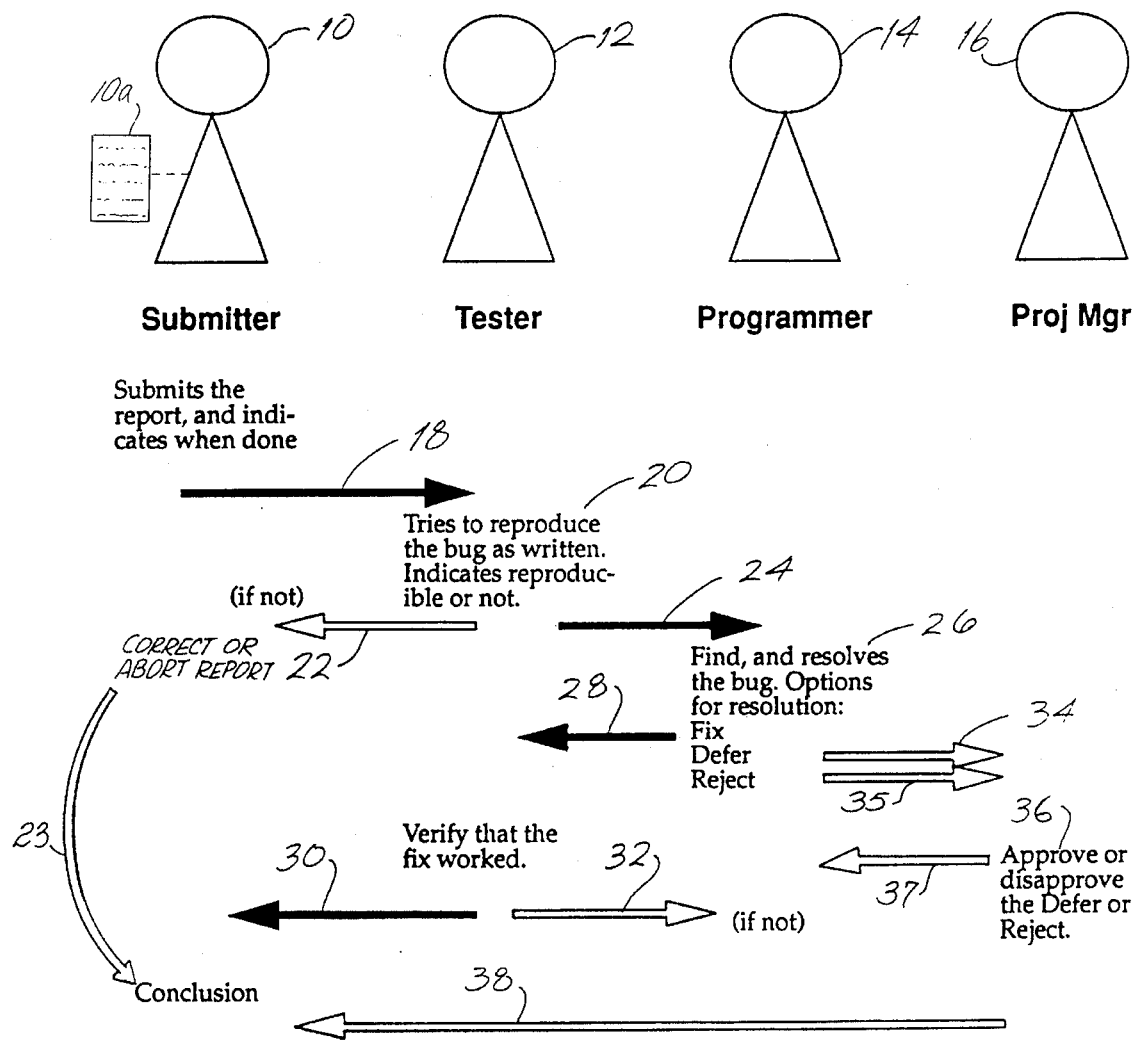

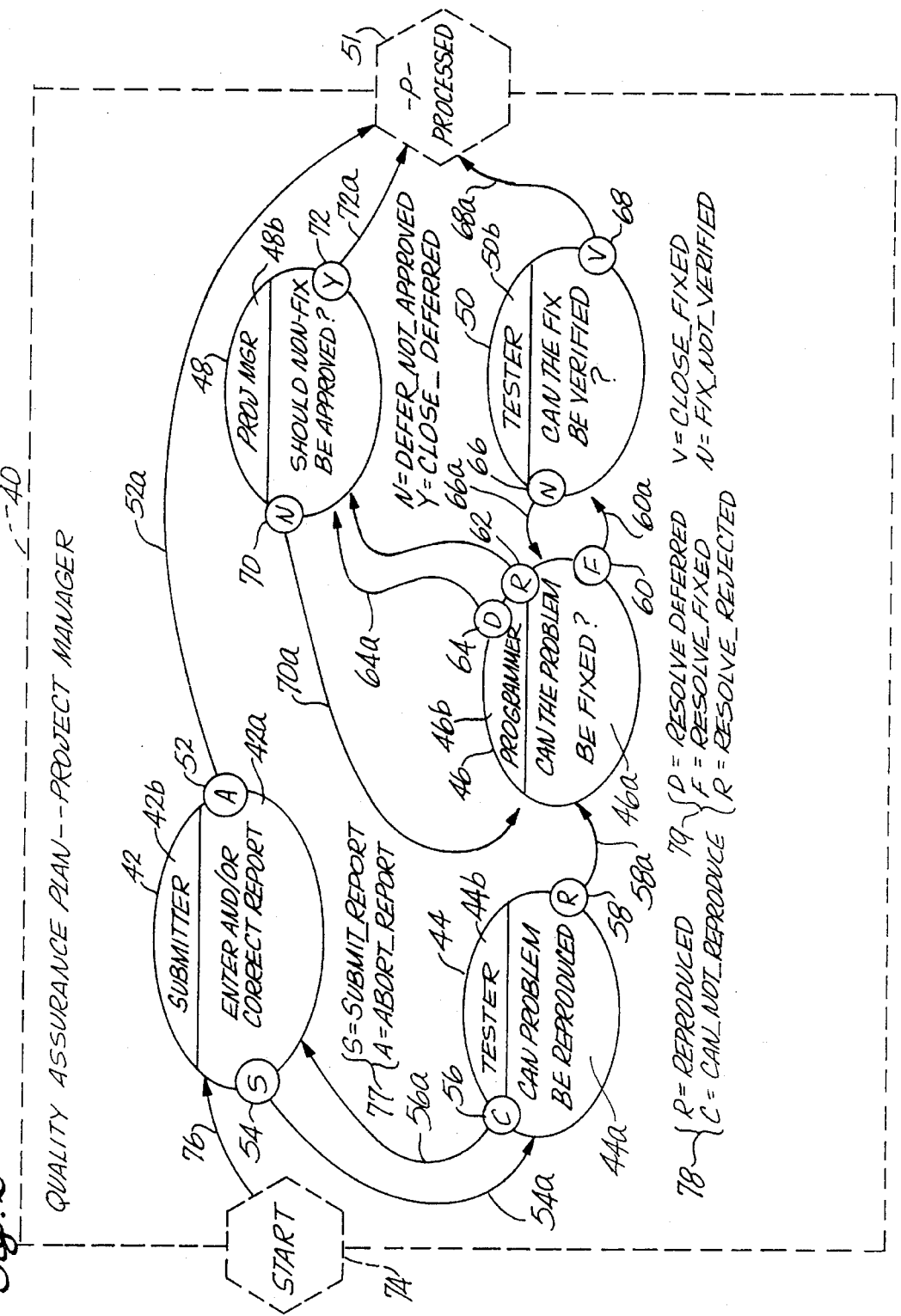

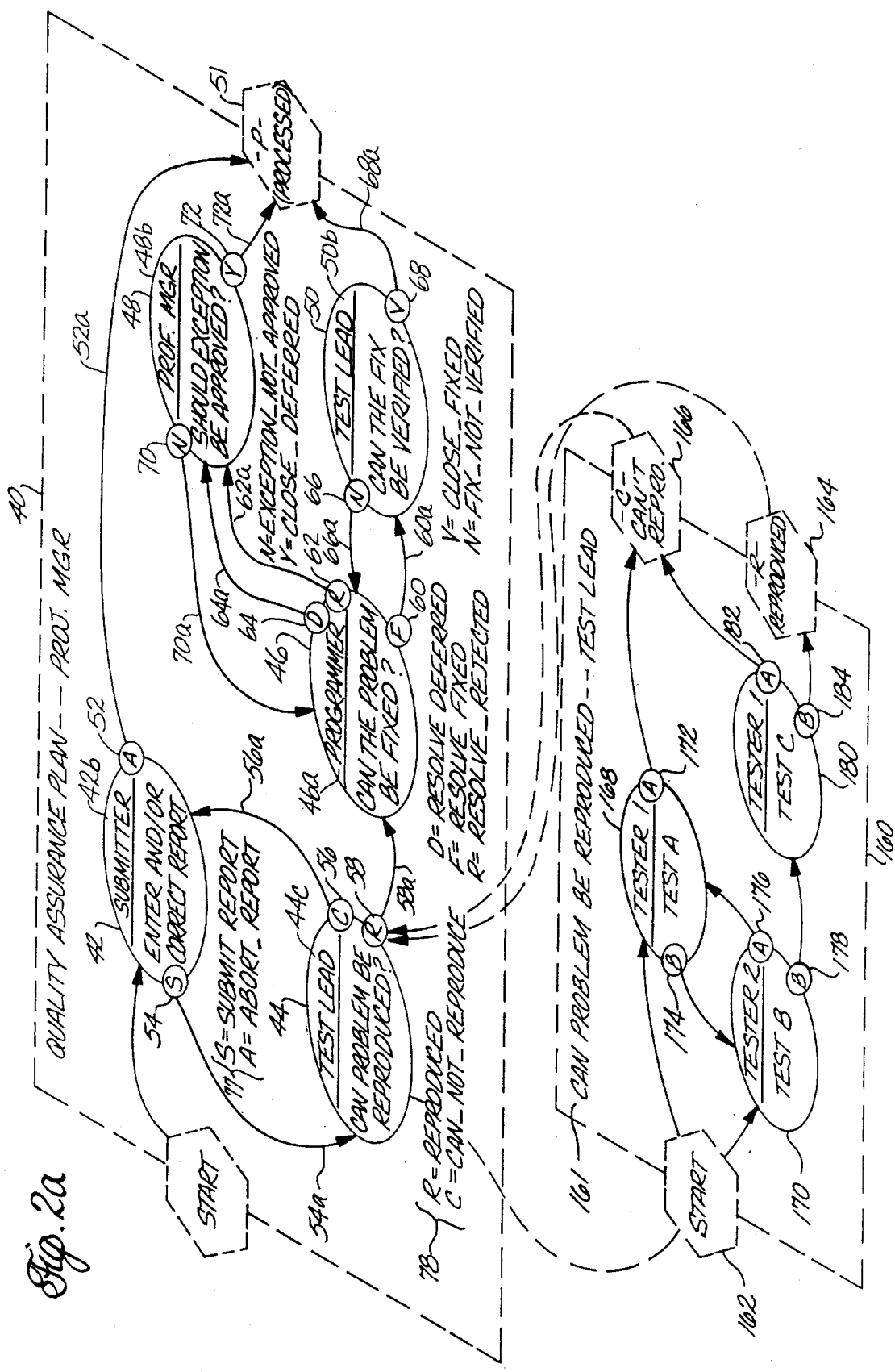

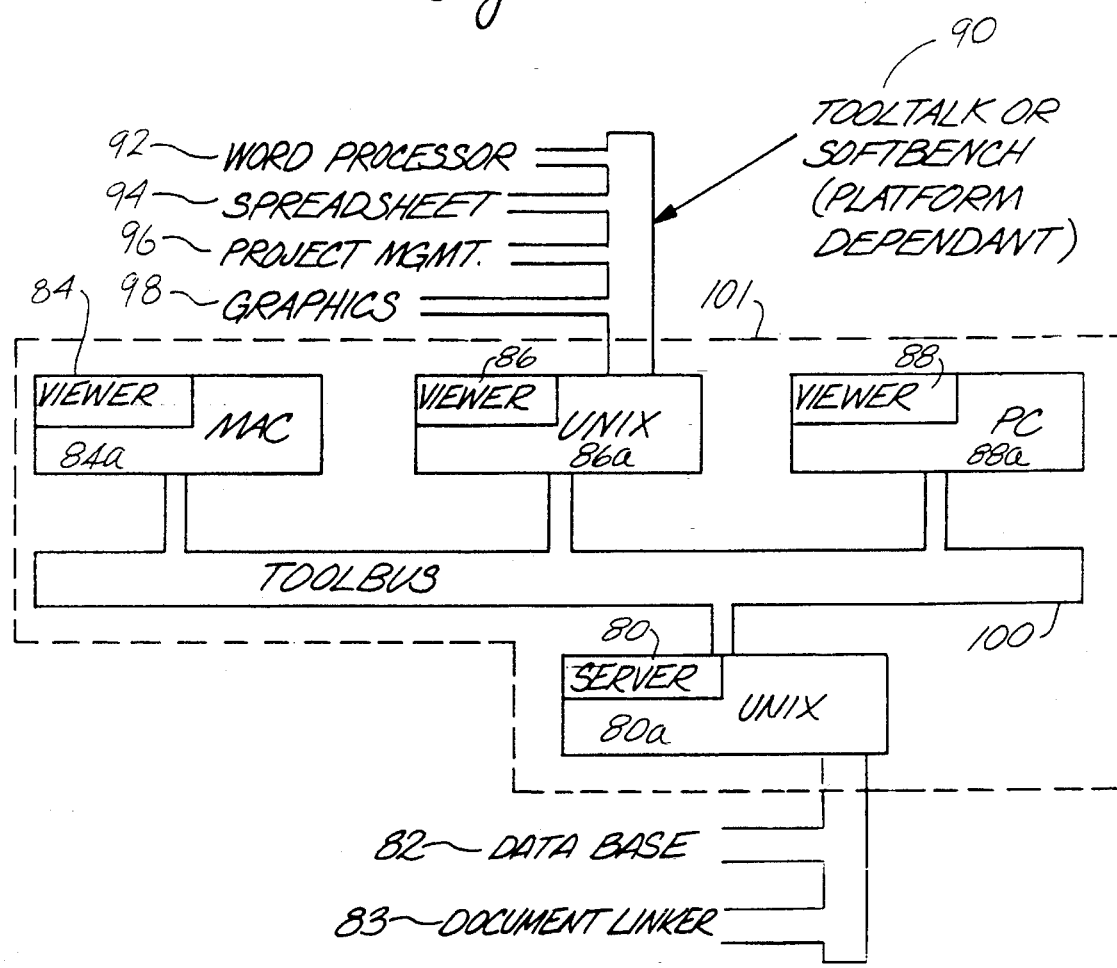

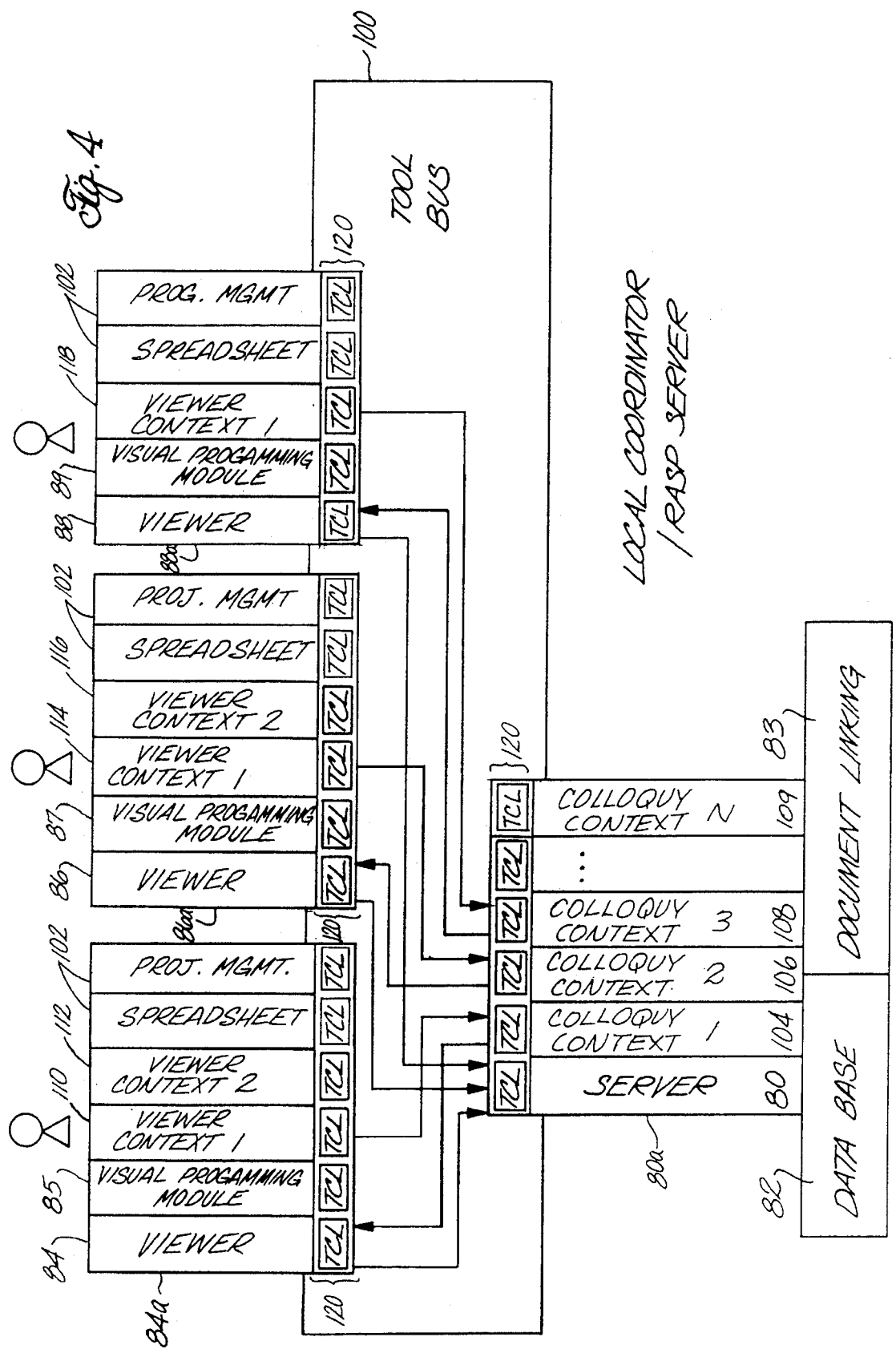

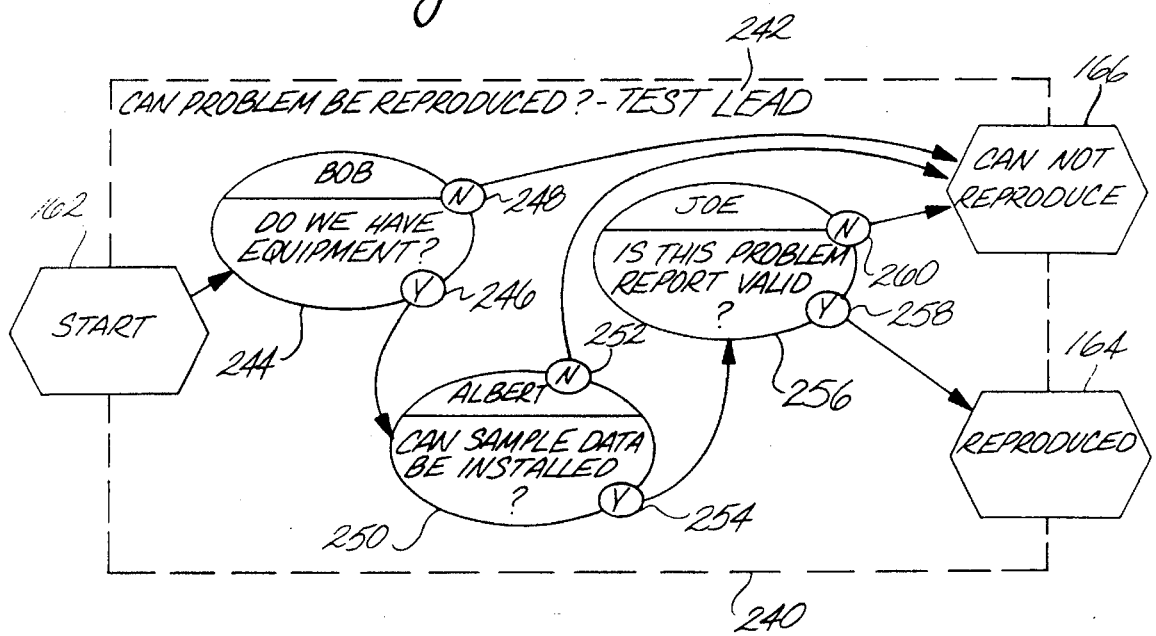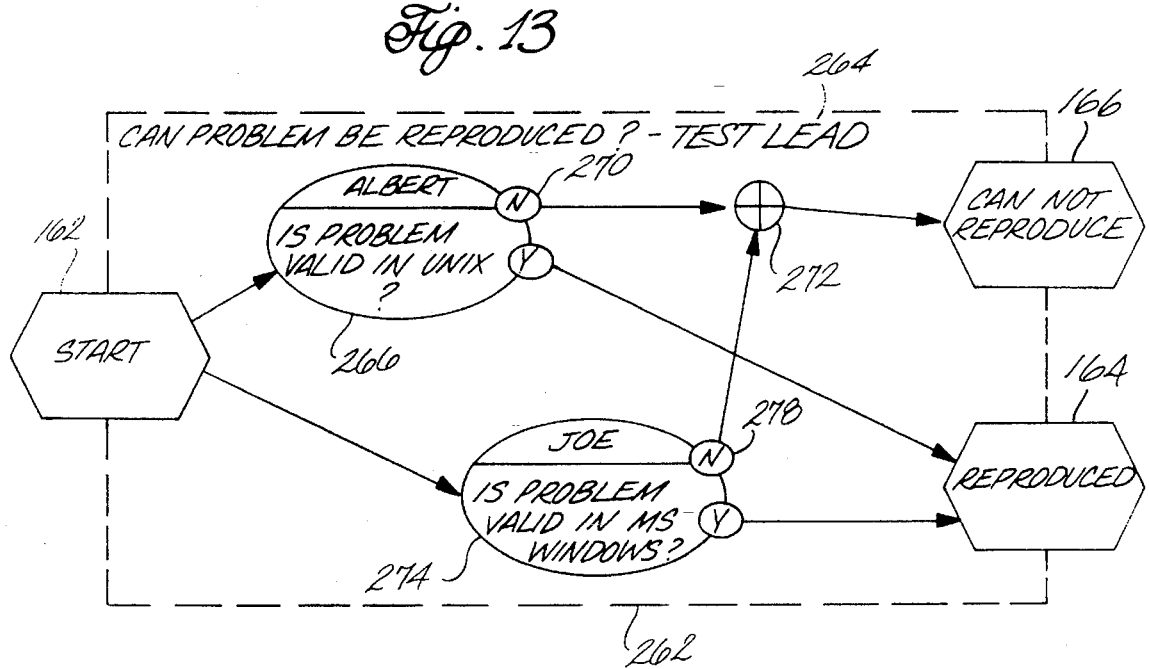

SYSTEM AND METHOD FOR MODELING, ANALYZING AND EXECUTING WORK PROCESS PLANS

CROSS REFERENCE TO RELATED APPLICATIONS

This is a continuation-in-part of application Ser. No. 08/035,381, filed Mar. 22, 1993, now abandoned.

REFERENCE TO MICROFICHE APPENDIX

A computer program listing is contained in a microfiche appendix and is incorporated by reference as if fully set forth herein. The microfiche appendix contains a total of two microfiche and a total of 195 frames of computer program listings.

BACKGROUND OF THE INVENTION

The present invention relates to automated systems for analyzing and regulating plans for work processes.

A major concern of businesses or any other group of people working together on a joint project is the efficient achievement of the goal of the project. In achieving this goal, many different tasks are performed by a variety of individuals within the group. Many of these tasks may only be performed after one or more other tasks are completed. Further, there is usually much communication between individuals or groups in the course of completing a task or in connection with indicating that a task has been completed. The various tasks necessary to complete the overall project or achieve an overall goal and the overall interrelationship between these tasks are called a work process.

In order to efficiently complete a project, the work process used to complete the project must be efficiently designed and efficiently executed. Much time and energy is devoted by organizations in seeking to improve the efficiency of both the design and the execution of work processes. In this quest, many different methods and systems used by computers for modelling work processes have been used. Some of these systems for modelling work processes have been used primarily to study a work process to find ways to make the process more efficient. Other systems for modelling work processes have been used primarily to aid in the efficient operation of a defined work process.

These prior methods and systems of modelling work processes suffer from a variety of disadvantages. Most of these methods and systems require the programming of the work process into a computer by a specialist, extensively trained in the use of the system and how to program it. Once the system has been programmed with a model of a work process, the model can be analyzed to determine inefficiencies and/or can be used to manage the execution of the modelled work process. However, once inefficiencies have been found or the work process model must be changed for other reasons, the programming specialist must be called in to reprogram the system to incorporate the changes.

Another disadvantage of the prior art work process modelling systems are that they are deterministic in nature. In other words, information or a journey through a series of tasks can only flow in one direction. Thus, a work process is not allowed to have loops or branches modified while the work process model is being executed so that when a task is or a series of tasks are executed multiple times, they must follow a predetermined sequence of tasks each time.

SUMMARY OF THE INVENTION

A programmed computer system according to the present invention attacks many of these problems by a unique modelling and storing of work processes. This system is both a work process automater and regulator and a real time work process engineering or re-engineering tool that can be used by any user.

The programmed computer system includes a server and a plurality of viewers, which communicate to each other via a common message bus. Users can use the viewers to view, create or modify a work process being administered by the server. Within the broad aspects of the invention, the computer system may be a mainframe computer system where the server and viewers are part of the main frame and users access the viewers through terminals. Alternatively, the viewers may be individual computer work stations and the server a separate work station coupled to the viewer work stations by a common bus. The system assists in simultaneously executing multiple models of work processes, called plans or work process plans. Each work process plan includes multiple tasks and interrelationships and interdependencies between tasks. The responsibility for each task may be assigned to one or more of the users of the system. Further, a single task in a work process plan may be programmed by one of the users assigned to that task to be a separate work process sub-plan, with multiple tasks, task interrelationships and task interdependencies. Responsibility for each of these new tasks in the sub-plan can be retained in the user creating the sub-plan or assigned to other users. Sub-plans for single tasks of other sub-plans may also be created. Both plans and sub-plans may be created or edited as the plan or sub-plan is being executed.

In executing a work process plan, the system performs many different functions. First, the system allows each user that is involved in the process access to the plan and the current status of the plan. One way of viewing a plan is through the use of a graphical planner. The graphical planner represents the plan stored in the system with visual symbols, according to a visual language. The graphical planner further allows a user to create or modify a plan using the same visual symbols. The graphical planner then translates the visual symbols into a computer representation and stores the resulting representation in the system.

In another way to view a plan, the system provides each user involved a list of all the tasks for which the user is responsible and that are currently active, or in other words, a list of tasks that need to be done by that user. The system accepts commands from a user responsible for a task signifying that the user is taking an action in that task. The system then consults the plan and activates and/or deactivates the other tasks based on the action taken by the user. Upon activating and deactivating these tasks, the system updates the list of active tasks for every user who is responsible for such tasks that have been activated or deactivated.

When a user issues an action command to the system, it may include comments that explain the user's action to another user involved in the process. These comments may be directed towards a user responsible for the task that will be activated by the action or towards another user.

The system stores and provides to users a history of the execution of a plan. This history shows all actions that have been taken in the plan, and details related to these past actions taken, including ancillary comments. The system can be programmed to automatically perform a set of instructions upon the start or end of any task. These instructions may include the running or control of any separate software application, the sending of e-mail or any other action that the system is capable of performing.

The system according to the present invention also allows the creation of work process plans through the use of a graphics planner using a visual programming language. A plan for performing a work process is programmed in this language by simply using computer provided tools to draw a model of a work process on the screen using special symbols. From the selection of these symbols and the way the user interconnects them, the system creates a computer representations of the work process model (a work process plan) which the system can use for executing the model of the work process.

The graphic planner can be used to make modifications to a plan or sub-plan even while the plan or sub-plan is being executed. It also is used to create sub-plans while the plan is being executed.

The system further stores pre-programmed policies that can be used to make plans. Thus, when a user is assigned a task or project, the user may use one of the pre-programmed policies to create a plan for completing the project. However, much of the time, the user will create the plan for completing the project or task at the same time the user is actually performing the project or task. In the case of a common task, though, a user can set up the system so that a certain policy is automatically invoked whenever a particular task is assigned to that user.

The feature of being able to modify a plan while it is being executed is a beneficial training system as well. A new worker can simply use the graphic planner to study the work processes for performing assorted tasks and projects that the new worker will be involved in. Further, because plans are modified on the fly, users are constantly modifying plans to reflect changes in the plan at the same time these changes in the plan are being made. Thus, the plans' use as a training tool is especially valuable because it is always up to date, unlike traditional printed training manuals.

BRIEF DESCRIPTION OF THE DRAWINGS

FIG. 1 is a diagram illustrating a work process and the communications involved in a typical work process for processing a detected bug.

FIG. 2 is a work process diagram of the work process shown in FIG. 1 created using an embodiment of the invention.

FIG. 2a is an enhanced work process diagram showing the relationship of the work process shown in FIG. 1 with a sub-plan created according to an embodiment of the invention.

FIG. 3 is a block diagram of the hardware and computer program architecture of a system according to the preferred embodiment of the invention.

FIG. 4 is a more detailed block diagram of the hardware and computer program architecture of a system shown in FIG. 3 further showing the flow of data.

FIG. 12 is a work process diagram of a sub-plan showing decomposition of a task into serial tasks created according to an embodiment of the invention.

FIG. 13 is a work process diagram of a sub-plan showing two tasks activated in parallel created according to an embodiment of the invention.

DETAILED DESCRIPTION

Figure 5:
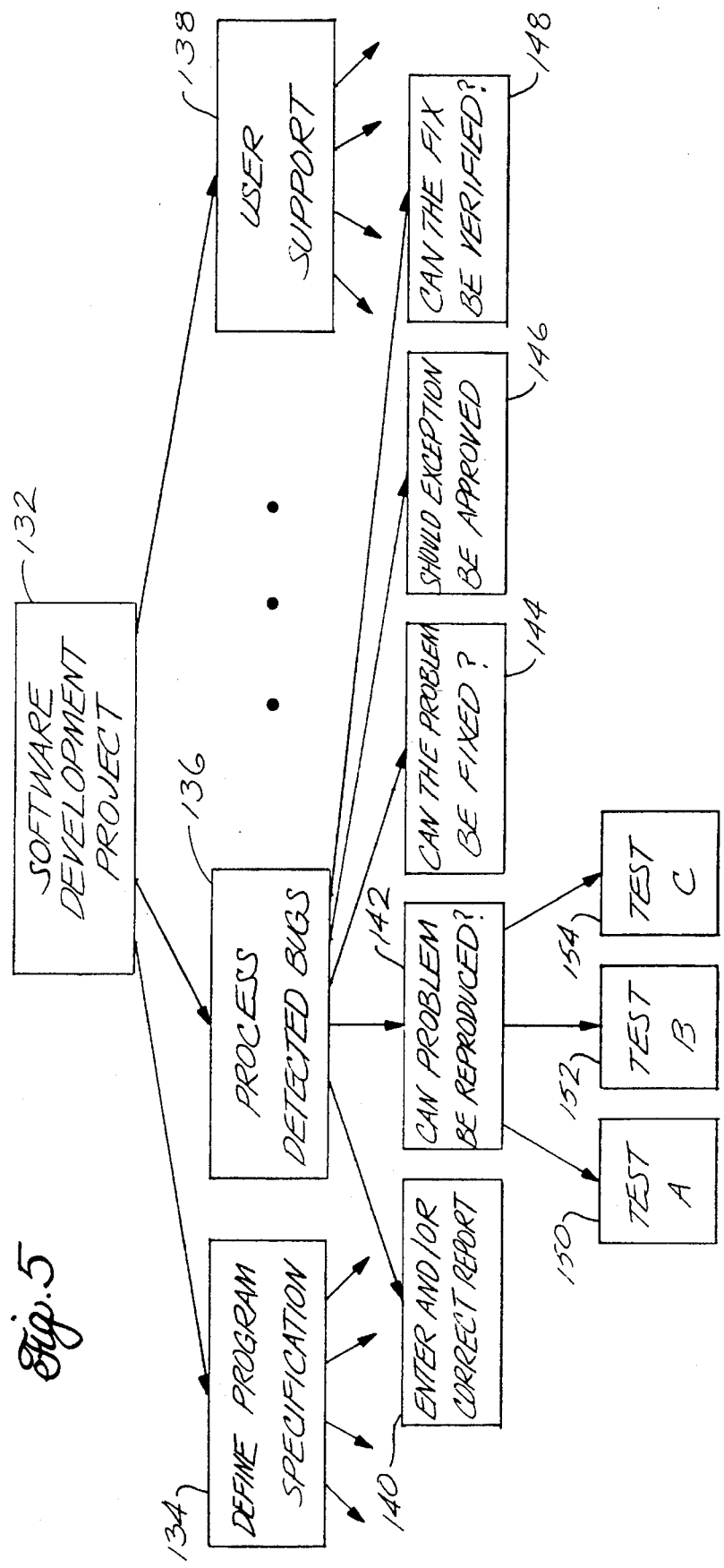
FIG. 5 is a tree diagram of the organization of objects, representing stages in a work process, stored in the system shown in FIGS. 3 and 4.

The user of the system according to a preferred embodiment of the present invention is at first faced with a project that must be done. For example, the project may be processing a bug detected in some computer program software (software). The project is accomplished by the execution of a work process. The project may start when a bug is detected and ends when the bug has been processed, by either fixing the bug, deferring the bug request or rejecting the bug request.

To accomplish such a project, it is helpful to have a plan for how to complete the project. In many cases, a person or group may have a general policy in place for how certain projects should be performed. In such cases, the plan for completing the project will simply consist of using the general policy for the current work process. If there is no policy for how the project should be completed, a plan must be created. If a plan thus created is accepted for general use, it may become a policy to be followed by all plans for completing that project.

FIG. 1 shows a diagram of a work process for processing a bug detected in some software. The process involves four individual users, a submitter 10, a tester 12, a programmer 14 and a project manager 16. The process begins when the submitter 10 submits 18 a report 10a of a bug (bug report) in the software to the tester. The tester then tries to reproduce 20 the bug on the software as the bug is described in the bug report. If the tester cannot reproduce the bug, the tester returns 22 the bug report to the submitter for correction. The submitter can either correct the bug report to better describe the bug or abort 23 the bug report if the submitter decides that there really was not a bug. If the bug report is aborted the process for processing that bug is completed. If the bug report is corrected, it is returned 18 to the tester who repeats the task of trying to reproduce 20 the bug. If the tester still cannot duplicate the bug, the bug report is again returned 22 to the submitter and the task of correcting or aborting the bug is performed again by the submitter.

If the tester can reproduce the bug, the bug report is passed 24 on to the programmer with directions to find and resolve 26 the bug. The programmer has three options for completing, finding and resolving the bug, namely, to fix 28 the bug, to request that fixing the bug be deferred 34 or to request that fixing the bug be rejected 35. If the programmer fixes the bug, the fixed software is then sent 28 to the tester. If the tester verifies 30 that the bug is fixed, the tester notes on the bug report and notifies the submitter that the bug has been fixed and the process is concluded. If the tester finds that the bug has not been fixed, the tester returns 32 the bug report to the programmer and informs the programmer that the bug has not been fixed. This restarts the programmer's task, with the programmer's associated three courses of action.

If the programmer requests that the fixing of a bug be deferred 34 or rejected 35, this request is made to the project manager 16. The programmer may wish to include reasons for the request such as that the module in which the bug occurs is temporary or incomplete and the module will be deleted, in which case fixing the bug would be wasted effort, or the module will be substantially modified or supplemented at a later date, which may eliminate the bug as a by-product of the modifications. The project manager has the option of approving or disapproving 36 the request for a bug fix deferral or rejection. If the project manager disapproves 36 the request, the bug report is sent 37 back to the programmer, who again has the same three options: fix the bug, request (again) a bug fix deferral or request (again) that fixing the bug be rejected. If the project manager approves 36 the request, this is noted on the bug report and the process is concluded 38.

A work process diagram 40, called a quality assurance plan, for performing the work process shown in FIG. 1, according to the preferred embodiment of the invention, is shown in FIG. 2. Each stage or oval 42–50 in the process diagram represents either a task to be performed or a question to be answered. Stages can either be active or inactive. When a stage is active, this signifies that the task or question is ready to be and needs to be addressed. A short description of the stage is located in the larger, lower portion of each oval (e.g., 42a of oval 42 and more generally, 42a–50a for ovals 42–50, respectively), while the smaller, upper portion of each oval (e.g., 42b of oval 42 and more generally, 42b–50b for ovals 42–50, respectively) contains the user or group of users who are responsible for that stage being performed. The small circles 52–72 with single letters inside of them on the borders of an oval and the arrows 52a–72a leading out of the small circles represent actions that may be taken in completing the task or question represented by the oval. The small circles represent the expected courses of action (or expectations) of the user(s) responsible for that stage. In other words, the user or users responsible for the stage are expected to select one of the options represented by the small circles on that stage's oval. An arrow leading from a small circle pointing to another stages generally mean that the stage being pointed to are ready to be and must be completed after the expected course of action represented by the small circle is performed. Since the user responsible for completing the stage at the tail of the arrow is obligated to perform the expected course of action corresponding to the arrow before the stage being pointed can be performed, the arrows are referred to as obligations. Combining the concepts of expectations (expected courses of action) and obligations, the selection of an expectation (represented by a small circle), fulfills an obligation (represented by an arrow) that must be fulfilled before the user responsible for another stage (the oval that the arrow points to) must complete this other stage. When an expectation (small circle) is selected, an event message (event), signifying the selection of the expectation is sent to another stage according to the corresponding obligation (arrow) that is fulfilled by that event, which activates the stage (oval) the obligation (arrow) points to. The activation of this second stage (oval) reveals other expectations, represented by the small circles on the second stage oval, for the user or users responsible for the second stage. The stage (oval) on which a small circle rests is deactivated when the action is taken, removing the responsibility for the stage from the responsible user listed at the top of the oval for that stage.

In the example shown in FIG. 1, when a bug is detected, the process is started with the submitter being responsible for entering a bug report. In the work process map shown in FIG. 2, the creation of this obligation on the submitter is represented by the arrow leading from a start node 74, represented by a hexagon, to the first stage oval 42. When the process is started, the arrow 76 from the start node activates the first stage oval 42, titled "Enter and/or Correct Report." Activation of this stage means that the submitter 42b is now responsible for completing the task listed in the stage. Upon completion of the task the submitter must take on the expected courses of action for that stage. However, a user responsible for a stage, such as submitter is responsible for stage 42, has up to three other options besides completing the stage by meeting one of the expectations of that stage. These options are to accept or decline responsibility of the stage or create a sub-plan for completing the stage. The option to accept responsibility is applicable if the responsibility for a stage lies in several users. In that case, any one of the responsible users can take individual responsibility for the stage by accepting the stage. The decline options is used if the user responsible for a stage is not able to complete the stage for some reason, such as that the user is overloaded with other work. If a user declines responsibility for one stage, the user can have a conversation, supported by the system, with the user responsible another stage that activated the stage. Sub-plans are discussed in more detail below. As described with reference to FIG. 1, the submitter is expected to either submit the bug report to the tester or abort the report if there is indeed no bug. These two expectations appear as the small circle with an "S" inside 54 and the small circle with an "A" inside 52, respectively. The captions 77, underneath the first oval identify what the expectations "S" and "A" mean. If the submitter submits the bug report, the expectation "S" is performed, triggering the obligation arrow 54a from the "S" small circle 54, which is followed to another stage, which is activated. In this case, the arrow from the "S" circle of the first oval points to the second oval 44, representing the question "Can problem be reproduced?" Therefore, stage 44 is activated, creating responsibility in the tester for determining whether the problem can be reproduced.

With respect to the second oval, the two options for the tester 44b described in reference to FIG. 1, are to conclude the tester can or cannot reproduce the bug. These options are represented by the small circles with arrows "C" 56 and "R" 58 and the corresponding captions "C=Can$_{13}$Not$_{13}$Reproduce" and "R=Reproduce" 78, respectively. According to the process in FIG. 1 if the tester cannot reproduce the bug, the submitter performs the task of the correcting or aborting correction of the bug on the bug report. In the map of FIG. 2, this contingency is shown by the arrow 56a leading from the "C", "Can$_{13}$Not$_{13}$Reproduce" circle 56 and pointing back to the first oval, "Enter and/or Correct Report" 42. This stage 42 is activated if the "C" action is chosen.

Similarly, the tasks of the programmer, project manager, and the verification task of the tester in FIG. 1 are represented in FIG. 2 by ovals 46, 48, and 50, respectively, with a representation for actions (small circles with arrows) 60–72, 60a–72a for every real life action that the programmer, project manager and tester, respectively, are expected to take, in the course of completing their respective tasks.

An example of the use of sub-plan for a particular stage in a work process plan in a plan, such as that shown in FIG. 2, is shown in FIG. 2a. More specifically, FIG. 2a shows a possible sub-plan for achieving the Can Problem by Reproduced? stage 44, which is known as a parent stage when there is a sub-plan for completing the stage. Looking at the Can Problem by Reproduced? stage, there is one way the stage may be activated, this is if the Submitter submits a bug report in stage 42, as shown by obligation (arrow) 54a. The two possible actions that can be taken in the Can Problem by Reproduced? stage are the two expectations (small circles) Reproduced 58 and Can$_{13}$Not$_{13}$Reproduce 56. Another way to look at this stage is shown in sub-plan 160. The sub-plan has one starting point, the start node 162 shown as a hexagon. In defining a sub-plan, it is not important how the sub-plan is started, just that the sub-plan does get started. Thus, only the word "start" is needed in the start hexagon 162.

The two possible ways the sub-plan can be completed are the two expectations, Reproduced 58 and Can$_{13}$Not$_{13}$Reproduce 56 of the Can Problem be Reproduced? stage 44. Thus, there are two end nodes 164, 166, shown as hexagons, in the sub-plan corresponding to the two expectations 58, 56 of the Can Problem be Reproduced? stage. When this sub-plan is initially created, the only things in the sub-plan are the start node 162 and the two end nodes 164, 166. Usually, a sub-plan is a combination of stages (expectations and obligations) that link the start node to at least one of the end nodes corresponding to the expectations of the parent stage. However, a user may create end nodes in a sub-plan that do not correspond with expectations in the parent stage. When an end node of a sub-plan is activated, the sub-plan is deactivated and the parent stage is activated. If the activated end node corresponds with an expectation of the parent stage, that expectation is then automatically met, which will, in turn, deactivate the parent stage. If the activated end node does not correspond with an expectation of the parent stage, no expectation of the parent stage is met and the parent stage remains active for the user responsible for that stage to complete the stage.

Referring to the sub-plan shown in FIG. 2a, when sub-plan 160 is activated, the start node automatically activates the Test A stage 168 and the Test B stage 170. The Test A stage is the responsibility of Tester 1 as Tester 1 is shown in the upper portion of the oval for the stage. The Test A stage has two expectations, A 172 and B 174. Expectation A 172 has an obligation (arrow) that leads to the exit node C-Can't$_{13}$Reproduce 166. If an action is taken in stage 168 that meets expectation A 172, the corresponding obligation (arrow) is triggered and the stage 168 is deactivated. When this obligation is triggered, the exit node 166, corresponding to the expectation 56 of the parent stage 44 is automatically triggered, thus also triggering the corresponding obligation 56a, which, in turn, activates the agent corresponding to stage 42. The other stages 170, 180 and the expectations 176, 178, 182, 184 and corresponding obligations (arrows) perform in the same manner.

It is important to note that only the user or users responsible for a stage are allowed to create a sub-plan to perform that stage. Thus, the many different sub-plans found in most colloquies will be created by many different users, creating a project wide effort in creating the colloquy. More importantly, though, is that the ones most knowledgeable about a sub-process, the users responsible for getting the sub-process done, are the users creating the corresponding portion of the colloquy.

Shown in FIGS. 3 and 4 is the hardware and software architecture of the preferred embodiment of a system to model, analyze and execute work processes, such as that shown in FIG. 1, according to a work process diagram, such as that shown in FIG. 2. In the preferred embodiment, the data and logic represented by the policy 40 shown in FIG. 2 are stored and managed by a software server module 80, running on a computer platform or computer work station 80a, such as a SPARCstation available from Sun Microsystems (SPARCStation is a trademark of Sun Microsystems) under the Unix operating system. Although one Unix system is disclosed by way of example, most other versions of the Unix system may be used.

In FIG. 3, the items inside the dotted line 101 depict the computer hardware and software for an embodiment of the invention. The items outside of the dotted lines are separate software applications that support users in the actual performance of the various tasks in work processes being modeled by the system. By way of example, the server module has access to a separate conventional database management application program 82 for storing and managing large amounts of data and a separate conventional document linker 83 for storing and linking data from documents. Such database management application programs and document linkers are conventional and readily available from a variety of commercial vendors.

Users of the system of FIG. 3 access the system through software viewer modules 84, 86 and 88 running on computer workstations such as a Macintosh, manufactured by Apple Computer (Macintosh is a trademark of Apple Computer) 84a, a Unix workstation 86a such as a Sun SPARCstation and an IBM compatible personal computer (PC) 88a (IBM is a trademark of International Business Machines Corporation). Each of these workstations include a data entry device, such as a keyboard, a display, memory and a processor (not shown). As shown for the Unix work station 86a, each computer platform includes its own conventional software applications, sold under well known trademarks, for performing traditional computer operations. For example, the Sun SPARCstation Unix work station 86a includes applications manager software 90, such as the ones known as ToolTalk, available from Sun Microsystems, (ToolTalk is and is a trademark of Sun Microsystems) or SoftBench, available from Hewlett Packard (SoftBench is and is a trademark of Hewlett Packard)) 90, word processor software 92, spreadsheet software 94, project manager software 96, and graphics software 98.

In the preferred embodiment, the system of FIGS. 3 and 4 is an open system and the server and viewer modules are platform independent, capable of being run on a variety of computer hardware. Both the server and viewer modules are written in the C++ object-oriented programming language, a standard programming language in the industry. Source code for the server module of a preferred embodiment is contained in the microfiche appendix to this application. This code is written specifically in C++ using the AT&T C++ language system release 2.1, available from Sun Microsystems. Many references concerning the C++ language have been published. One such reference is "The Waite Group's® C++ Programming, Second Edition" by John Thomas Berry, published by SAMS, Carmel, Ind., which is hereby incorporated by reference, as if set forth in full herein. The use of the C++ programming language enables the modules to be relatively computer platform independent, allowing for the use of alternative embodiments which run the server and viewer modules on different computer hardware, such as an IBM PC compatible or a Macintosh computer platform. The preferred embodiment further utilizes the tools.h++ C++ programming tool package, produced by Rogue Wave (tools.h++ is a trademark of Rogue Wave). The Users Manual for tools.h++ is incorporated by reference as if fully set forth herein.

Viewer modules 84, 86 and 88, and workstations 84a, 86a and 88a, respectively, are connected to the server module 80 and workstation 80a and to the other viewer modules and workstations by a message bus. In the preferred embodiment, the message bus is the ToolBus ("TBus") 100, a combination of hardware and software, which is implemented on MBus (developed by the University of Illinois), which is in turn implemented in the implementation of TCP/IP (Transmission Control Protocol/Internet Protocol), available from Sun Microsystems. The use of the TCP/IP protocol allows the hardware part of the connections between the workstations to be transparent to the computer programs connected to the bus. The hardware connection can be an ethernet, token ring or any other type of network. The only requirement is that TCP/IP can be implemented on the workstation and network. No matter what hardware network is used, to the programs running on each workstation, the TBus looks and acts like a simple data bus between all of the workstations. The nature of this bus is such that any communication between any of the computer workstations on the bus can by seen and accessed by all of the viewer modules and the server module.

FIG. 4 shows the system architecture of the software run on the system of FIG. 3, including the viewer and server modules, in more detail. As in FIG. 3, the system has viewer modules 84–88 and a server module 80, all connected to the TBus 100. Also, the computer workstations running the viewer modules also run separate, independent applications software 102 such as the application software 92–98 shown in FIG. 3, including program manager and spreadsheet software, or any other software that may be useful for the users in performing their work.

Each project, such as that shown in FIG. 1, that is modeled by a work process plan, such as the shown in FIG. 2, is referred to as a colloquy when it is being administered by the server module. Individual colloquies may include more than one plan that are executed in parallel, in series, or a combination of series and parallel. Plans in a colloquy may further have sub-plans, sub-sub-plans, etc. When a user, through a viewer module, signs on to a particular colloquy, the server module initiates the running of a colloquy context software program (colloquy context) 104 that is a separate program, run separately from the server module, but which is created, monitored and controlled by the server module. Each colloquy context operates as a separate program, receiving and sending commands and data over the TBus independent of other colloquy contexts or the server module.

The server module is capable of initiating the running of numerous colloquy contexts, such as those depicted as 104–109, at one time. For example, FIG. 2 shows a policy to be used as a plan for processing detected bugs. In the system of the preferred embodiment, the system may simultaneously be executing hundreds or thousands of plans that follow this policy, each plan corresponding to a single bug report that is being processed. Each of these plans would have its own colloquy context running the colloquy for tracking that plan.

Similarly, when a user operates a viewer module, 84–88, a viewer context program 110–118 is initiated by the viewer module being used, and run on the same workstation being used by the viewer module, for every colloquy that a user signs onto. Each viewer context operates independently of the other viewer contexts running on the same workstation and the other viewer contexts running on other workstations. The number of viewer contexts running on a particular workstation is equal to the number of colloquies that the user is accessing at that time.

The viewer modules, viewer context modules, server module and colloquy context modules communicate via the TBus 100, described above. The actual messages broadcast over the TBus utilize the Tool Control Language ("TCL") syntax developed at U.C. Berkeley and available from Berkeley on-line from Barkley@ Berkeley. Documentation for TCL is published in on-line documentation provided with TCL. The documentation for TCL, version 6.7, is incorporated by reference herein. TCL interpreters 120 using the TCL syntax are provided between the TBus and the viewer modules, server module and contexts for generating and interpreting TCL messages broadcast on the TBus. TCL is used as the common language of all messages broadcast on the TBus so that the information broadcast on the TBus can be sent and received by any type of workstation. The TCL interpreters translate the universal TCL messages into messages that can be interpreted by the corresponding workstations.

All of the data and logic that represents a colloquy, such as a project following the policy 40 shown in FIG. 2, are stored and managed by the server 80. When a user wishes to access the colloquy for a particular project, the viewer module is used to request information about the project represented in the colloquy from the server module. The viewer module itself does not store any data or logic regarding a project except what it needs for display in the current window being displayed to the user. A viewer module, in combination with the corresponding workstation, essentially forms a smart terminal. It requests information from the server module 80 either automatically or in response to simple commands entered by the user on the data entry device of the corresponding workstation. It then presents the information received from the server in a useful format on the display of the corresponding workstation.

The viewer module also includes a software visual programming module. This module is a graphics based program written using conventional programming techniques and utilizing conventional graphical user interface techniques, such as pull down menus, pointers that appear on a workstation display controlled by a mouse or other type of pointing device (e.g., track-ball, digitizer tablet, touch screen), highlighting of various options based on pointing device input and buttons operated by the pointing device. The visual programming module allows a user to create on the display of a workstation, a graphical diagram, similar to that shown in FIGS. 2 and 2a, representing a work process model. The visual programming module then converts the graphical diagram representation of the work process model into data that is communicated by a viewer module to the server module via the TBus. The server module uses this data to create a computer representation of the work process model. This computer representation of the work process model and the process for converting the graphical diagram representation of a work process model into a computer representation is discussed below in connection with Table 1 and FIG. 19.

The viewer module and viewer contexts on one computer workstation generally do not direct communications to viewer modules or viewer contexts on other computer workstations. Rather, they send and receive messages to or from the computer workstation running the server module and/or colloquy contexts. Thus, when, in a work process plan such as that shown in FIG. 2, it appears that information is being passed from a user responsible for one stage to the user or users responsible for a second stage, in the preferred embodiment, no direct communication between these users or their respective workstations occurs. Rather, a viewer context of the first user sends a message to the corresponding colloquy context. After the colloquy context consults the data and logic of the plan being executed, it sends messages to all of the viewer contexts, but includes data in these messages indicating that the messages are directed towards the user or users responsible for the second stage. The viewer contexts of all of the other users receive these messages, but because the messages are not directed to them they generally just monitor these messages take no action on them. With this structure, the colloquy context is globally aware of everything that happens relating to a plan that the colloquy context is managing.

The data and logic of each work process plan are stored by the server module in its workspace as a tree of C++ objects. C++ objects are structures provided for in the C++ language that contain both data and logic. The basic building block of this tree is a C++ object that represent a stage of a work process plan (e.g., an oval shown in FIG. 2). Each C++ object that represents a stage is called an agent. Each agent is defined as one of a C++ class labeled VPLActiveAgent. The class VPLActiveAgent further inherits all of the characteristics of the class VPLAgent. Thus, every agent includes the declarations and code in both VPLActiveAgent and, by inheritance, VPLAgent. Portions of the data declarations for both of these classes are listed in Table 1. Reference numerals 450–470 herein refer to Table 1 below.

The RWCString ShortDescription 460 holds the text that appears in the lower portion of a stage oval, such as the text "Enter and/or Correct Report" 42a in FIG. 2. The RWCString LongDescription 462 holds a more detailed description of the task or question, identified by the ShortDescription, to be resolved in the agent. This LongDescription is used primarily as a help message and is described in more detail below.

The Prologue$_{13}$Tcl 466, Body$_{13}$Tcl 468 and Epilogue$_{13}$Tcl 470 RWCStrings hold TCL scripts that are executed when the agent is initialized, activated and deactivated, respectively. TCL scripts are basically lists (including logic and control expressions) of TCL commands or messages that may be broadcast over the TBus. TCL scripts may be used to implement a particular type of agent, such as those shown in FIGS. 10–18 and discussed below. TCL scripts can also be used to program the automatic execution of other software applications separate and independent from the system of the preferred embodiment.

For example, a particular stage may represent the task that a user must write a report based on information generated or made available earlier in the work process. A TCL script may be programmed to execute when that particular stage is activated, to initiate the creation of a form report that is filled in with information that is only known to be available on the system when the particular stage is activated. The TCL script can further initiate the running of conventional word processing software and loading the completed form report into the word processing software. The TCL script would thus allow the user to quickly check and finalize the report to complete the task represented by the stage instead of having to initiate the running of the conventional word processing software itself and create the report from scratch.

All of the expectations and obligations in a work process plan according to the preferred embodiment are represented by C++ objects. Expectations are stored in object that are of the class "VPLExpectation" and obligations are stored in objects that are of the class "VPLObligations." Each agent includes a table, implemented with ordered RWSets including *Obligations 454 and *Expectations 456 that contain pointers to all of the objects representing the expectations (expectation objects) and corresponding obligations (obligation objects) for that agent. In the case of the agent for stage 44 of FIG. 2, for example, the expectations are "C" 56 and "R" 58. In the *Expectation RWSet 456, for each expectation (e.g., 56), a pointer to the expectation object for that expectation is stored in a set order. The expectation object contains the expectation description (e.g., 78) for the corresponding expectation. The first character of this description is used by the system as the letter shown in the small circle that graphically represents the expectation.

The table also may represent one or more obligations (represented by arrows in FIG. 2) for each expectation. In the case of the "C" expectation 56 in FIG. 2, the obligation is arrow 56a that points to the Enter and/or Correct Report stage 42. In the case of the agent representing stage 44, the *Obligation RWSet 454 includes a pointer the obligation object that represents obligation 56a. This obligation object contains a pointer stored in "*Agent" to the agent that represents stage 42. The obligation also includes an obligation id token stored in "RWCString OToken" that is a unique label for the obligation. The expectation object for the expectation associated with an obligation includes the id token for that obligation, stored in "RWCString Otoken." This allows the obligations for an expectation to be located by searching the RWCString OToken in the obligation objects pointed to by the pointers in RWSet *Obligations for an obligation id token that matches that stored in the expectation object. Similar to the pointers to Expectations in RWSet *Expectations, the pointers to obligation objects are stored in the *Obligation RWSet in a set order.

When a work process plan is being modelled in real time by the system, the agents representing the different stages of the plan can have either an active or an inactive status. Generally, if an agent is active, the expectation corresponding to the obligation pointing to the agent has been met and the task or question represented by the agent needs to be addressed. The other possible status of an agent is if it is a sub-plan. In that case, a sub-plan status indicates that the agent is a sub-plan and that the agent or agents of the sub-plan pointed to by the obligations leading from the start node of the sub-plan are activated. The active, inactive or sub-plan status of an agent is represented in int status 450 using a code.

The user or group of users that are responsible for the stage represented by an agent are stored in the *Groups RWSet 464, which points to locations in the list of the system's users. For the agent representing stage 44 shown in FIG. 2, *Group would contain a single pointer to the user "Tester" 44b.

A work process plan is made up of many stages. As each stage in a work process plan is represented by an agent in a colloquy, colloquies also often have many agents. In a complex colloquy, the number of agents could be tens of thousands or more. In order to allow easy access to smaller, more manageable portions of a colloquy and to allow modification or creation of a colloquy, sub-colloquy, sub-plan or any agent of a colloquy while the colloquy has active stages in it, the agents of a colloquy are stored in a tree structure.

FIG. 5 shows a tree structure for storing a colloquy in which the plan shown in FIGS. 2 is be used as the a sub-colloquy, Process Detected Bugs 136. The root colloquy (an agent as shown in Table 1) called Software Development Project 132 includes a start node with at least one obligation and an end node like the plan shown in FIG. 2 (e.g., start node 74 and end node 51). Information regarding the agents making up the root colloquy is stored in a C++ object of the class "Policy." This object represents the obligations of the start node in a list of pointers to the agents pointed to by the obligations stored in "RWSet *startAgents." It also includes pointers to all of the agents for each of the sub-colloquies contained in the colloquy, including the sub-colloquies Define Program Specification 134, Process Detected Bugs 136, User Support 138 and other sub-colloquies (not shown, but presence indicated by dots).

Most of these sub-colloquies or sub-plans consist of numerous other agents, some of which also have sub-plans. With each sub-colloquy and sub-plan is also associated a C++ object of the class "Policy" that holds a list of pointers to the agents making up the sub-colloquy or sub-plan. Each agent representing a sub-colloquy or sub-plan (VPLActiveAgent) stores the "RWCString name" for this "Policy" class C++ object in "RWCString hSubPolicy" 458, shown in Table 1. Sub-colloquy Process Detected Bugs 136, for example, which corresponds to the plan 40 shown in FIG. 2, contains the RWCString name for the Policy object that contains pointers to agents Enter and/or Correct Report 140, Can Problem be Reproduced? 142, Can the Problem be Fixed? 144, Should Exception be Approved 146 and Can the Fix be Verified 148, that correspond to stages 42–50 with the same names, shown in FIG. 2. Conversely, each agent (VPLAgent) pointed to by a Policy class object contains a pointer, in "Policy *policy" 463, shown in Table 1, that points to the Policy class object representing the sub-colloquy or sub-plan in which it is contained.

Each of the sub-colloquies are themselves agents, containing a short and long description, name, a responsible user or group of users and an action table of expectations and corresponding obligations for the sub-colloquy as a whole. The action tables of the sub-colloquies 134–138, as with all other agents, contain the expectations (small circles) and associated obligations (arrows) of the sub-colloquies. Thus, a visual process map of the root colloquy 132, of the type shown in FIG. 2, consisting of just the sub-colloquies and their interrelationships can be created, without showing any of their sub-plans.

Returning to the plan shown in FIG. 2 and shown in FIG. 5 as Process Detected Bugs sub-colloquy 136, the action table in this sub-colloquy thus includes the expectation "Processed", corresponding to the end node "-P- Processed" 51 shown in FIG. 2, and an obligation that activates another stage or sub-colloquy in the parent colloquy 132 when the expectation is met. The sub-colloquy 136 also includes a short and long description and a user who is responsible for the sub-colloquy. The sub-colloquy contains pointers to the objects that embody all of the agents and sub-plans in the sub-colloquy. In the Process Detected Bugs sub-colloquy 136, an agent 140–148 is pointed to for each of the stages (ovals) 42–48 shown in FIGS. 2 and 2a.

Each of these agents has its own short and long description and a responsible user. The agents also contain the expectation and obligation table for each of the stages.

Figure 6:
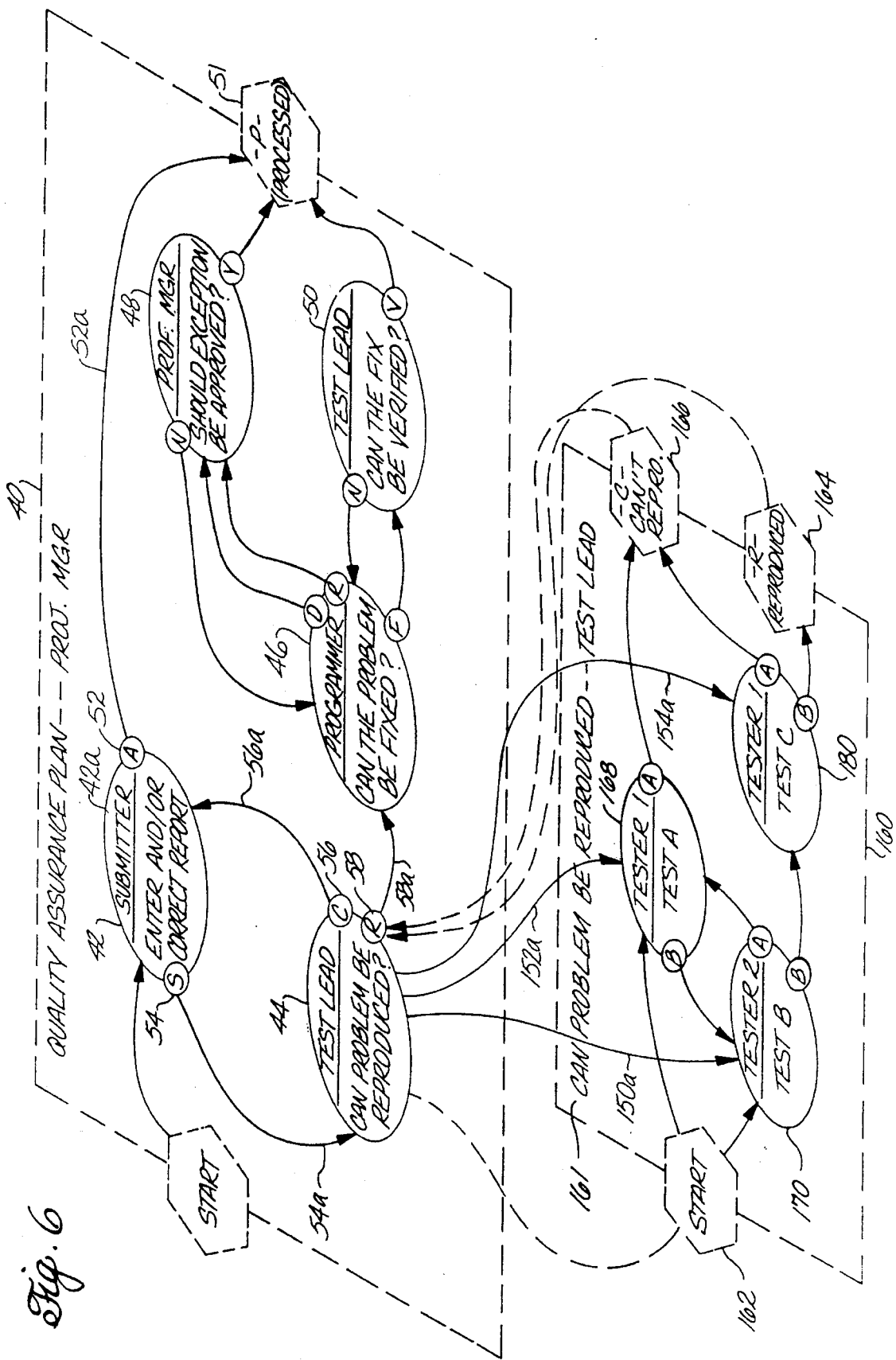
FIG. 6 is a simplified version of the enhanced work process diagram, shown in FIG. 2a, of the work process shown in FIG. 1 with a sub-plan created according to an embodiment of the invention, illustrating the use of the organization of objects shown in FIG. 5.

Any of the objects 140–148 that are pointed to by the Process Detected Bugs sub-colloquy 136 can be a sub-plan rather than an agent representing a simple stage. The agent 142 representing the Can Problem be Reproduced stage 44 is shown as if it contained such a sub-plan. From looking at the tree structure, it is seen that the sub-plan agent 142 has three stages, represented by agents Test A 150, Test B 152 and Test C 154. These agents correspond to stages Test A 168, Test B 170 and Test C 180 shown in FIGS. 2a and 6. FIG. 6 is a simplified version of FIG. 2a that also shows how diagram in FIG. 2a would look like if the pointers in the tree diagram shown in FIG. 5 from the Can Problem Be Reproduced? agent 142 to Test A agent 150, Test B agent 152 and Test C agent 154 were drawn onto FIG. 2a. These pointers appear on FIG. 6 as arrows 150a, 152a and 154a respectively. Thus, it can be seen that the combination of the obligation pointers, which appear as arrows on a horizontal plane on the work process diagram shown in FIG. 2, and the tree pointers, which appear as vertical arrows on the work process model diagram shown in FIG. 6, make up a complete representation of the three dimensional work process diagram as shown in FIG. 2a.

In the case of the Can Problem be Reproduced sub-plan 142, the agents for the sub-plan contains all of the same information that was contained in the agent for the Can Problem be Reproduced stage 44 shown in FIG. 2. However, it additionally contains pointers to the objects for the three agents 150–154 that are part of this sub-plan. Each of the objects representing an agent contains a short and long description and a responsible owner. Further for each agent's object 150–154, there is an action object that includes the expectations and corresponding obligations for that agent.

The preferred embodiment of the structure for storing colloquy data and logic has several advantages that arise from the architecture of the structure. First, a colloquy can be changed dynamically, in other words, while the colloquy is being executed or used. This is possible because the links between sub-colloquies, sub-plans and agents are stored in a tree linked with pointers, not a rigid data structure. By using an object to store the information about each agent's expectations and obligations, changes to an agent that is under an obligation to a current agent are invisible to that current agent, thus eliminating complex updating of the plan that ordinarily might be caused by a change in an agent. This benefit is further amplified by the fact that the agents are not even referenced by a colloquy context 104–109 unless the corresponding stage is active or the graphic image of the plan containing the stage is being made or modified.

Another benefit of this structure is that it is easy to show the status of a colloquy or create a visual representation of a colloquy at different levels. For example, a top executive is most likely not concerned with the details of how a detected bug is processed. However, he is likely to want to know the overall process of the software development project, which includes the sub-colloquy, as one oval, of processing detected bugs. On the other extreme, an individual tester in a group of testers may only be concerned with the process of verifying a bug and may not even be concerned about the more general sub-colloquy to Process Detected Bugs 136. The combination of the tree structure and user responsibility for stages and sub-plans allows easy separation of a very large colloquy into levels of the colloquy that are meaningful to particular users. Only the graphical representation of the plans or sub-plans for which the user is responsible or in which there are stages for which the user is responsible are ordinarily provided. Usually, all of these stages and sub-plans are located within a few levels of each other in the tree structure, further simplifying the access to the plans and sub-plans.

Figure 7:
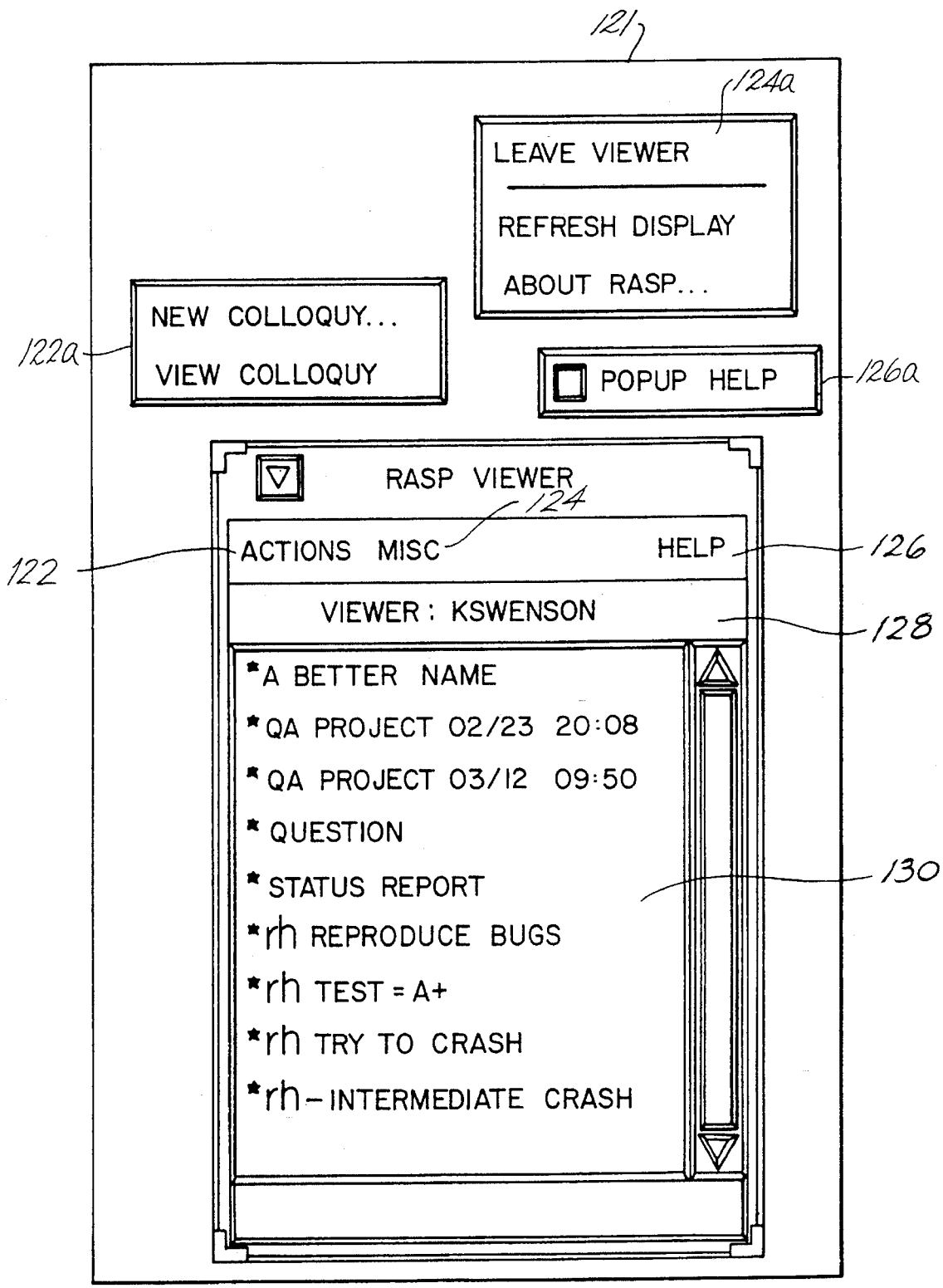
FIG. 7 is a view of an information window created by the viewer module of the system shown in FIGS. 3 and 4.

Consider now the viewer modules. When a user initiates one of viewer modules 84a, 86a or 88a, an information window 121 like that shown in FIG. 7 is displayed on the display of the workstation the user is using. The information window shown in FIG. 7 differs from the actual information window shown on the display of a workstation in the preferred embodiment in that the contents of pull down menus 122–126 are shown at the top of the information window as separate menus 122a–126a. The commands "New Colloquy . . ." and "View Colloquy" 122a are listed under the Actions pull down menu 122. The commands "Leave Viewer," "Refresh Display" and "About RASP . . ." 124a appear under the Misc. pull down menu 124. The command "Popup Help" 126a appears under the Help pull down menu 126.

The identification line 128 of the viewer module identifies the user ID of the user using the viewer. When the viewer searches for active stages that the user is responsible for, the user ID, e.g., KSWENSON, shown in the identification line is the user that is searched.

The colloquy window 130 lists the colloquies that the user may view. An asterisk before the name of the colloquy indicates that the user is responsible for a stage that is active in that colloquy or in a sub-colloquy of that colloquy.

If the user desires a more detailed description of the colloquies, selecting the "Popup Help" command 126a from the Help menu causes a window with a more detail description of a colloquy to appear when the colloquy is selected by a pointing device such as a mouse (not shown). The popup help command will also give descriptions of what commands listed in the pull-down menus do when the command is selected.

The viewer obtains the information it displays in the colloquy window 130 by issuing a "GetPolicies" command over the TBus 100 with a parameter containing the user's user ID. The server 80 receives this command and searches through its colloquy database for all colloquies that the user has permission to access. The server then determines which of these colloquies contain an active agent for which the user is responsible. The server broadcasts a "Policies" message on the bus with a list of policy descriptions. Each policy description includes the policy's name, colloquy ID number, a short description, a long description and an active stage flag. The short description is displayed in the colloquy window, the active stage flag is used to determine whether an asterisk should be displayed for that colloquy and the long description is used in the popup help.

Figure 8:
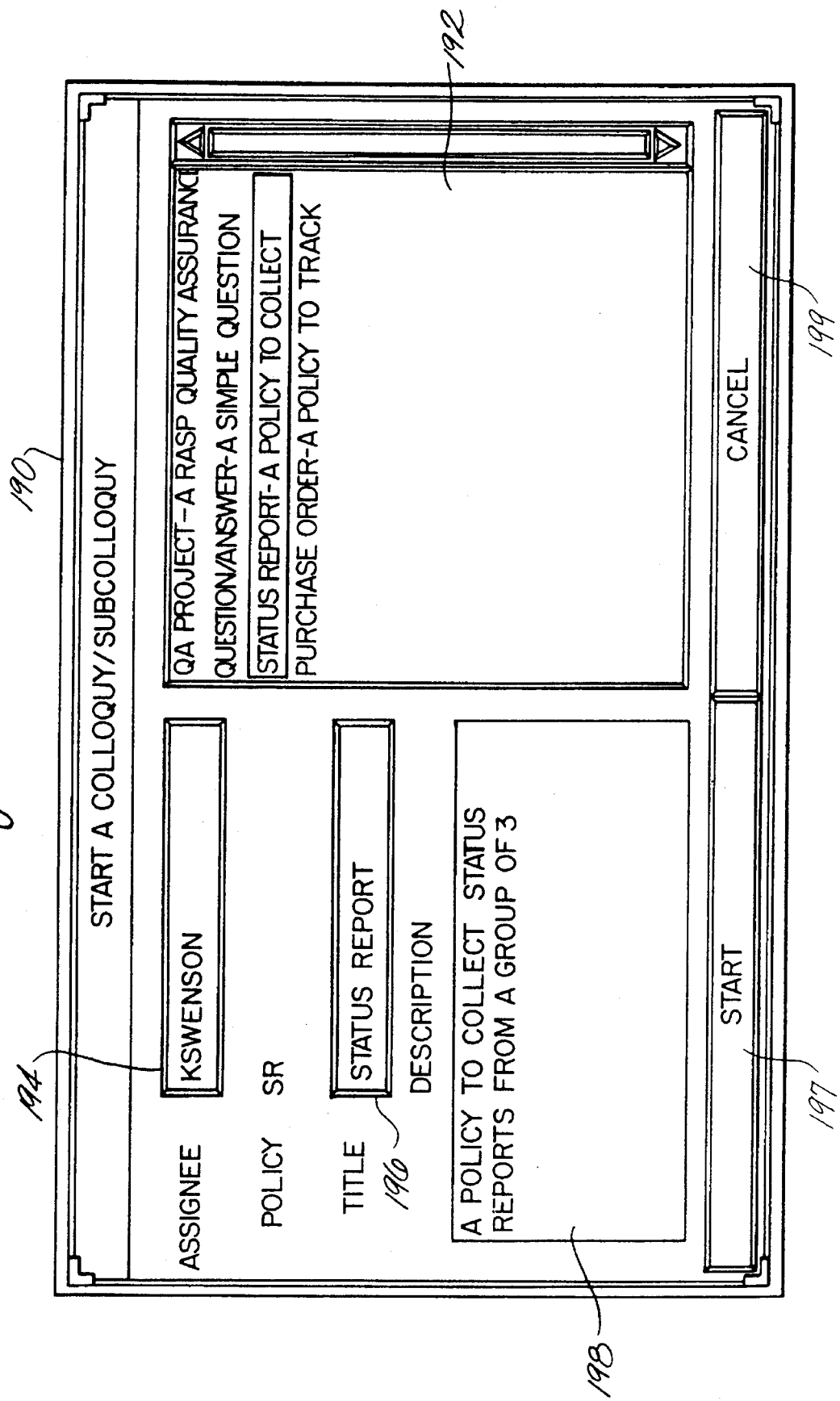
FIG. 8 is a view of a screen created by the viewer module of the system shown in FIGS. 3 and 4 to start a colloquy or sub-colloquy.

If the user wishes to create a new colloquy, the "New Colloquy . . ." command is selected and the viewer prompts the user for the title of the new colloquy. The viewer uses the policy screen 190 shown in FIG. 8 to do so. The available policies are listed in policy window 192. The current user, e.g., KSWENSON is listed in assignee field 194. The title of the policy currently highlighted (shown as a surrounding rectangle in FIG. 7) in policy window 192, STATUS REPORT, is shown in field 196. A description of this policy is shown in description window 198. To start the currently highlighted policy, the user presses the "START" button 197 on the policy screen. If no policy in the policy window is highlighted, the user is allowed to create a new policy. If the user decides not to start or create a policy, the user presses the "CANCEL" button 199 and is returned to the display shown in FIG. 7.

If the user presses the "START" button, the viewer module then broadcasts a "StartColloquy" message over the TBus with the title of the selected policy to the server. The server module then starts up the visual programming language module to allow the modification or creation of the policy.

Returning to FIG. 7, if the user wishes to view an existing colloquy, the user selects the colloquy and then selects the "View Colloquy" command from the Actions menu 122a. The viewer sends a "ViewColloquy" message to the server via the TBus, with the parameters for the user's user ID and the Colloquy ID of the colloquy selected. The server then returns a "CreateContext" with the user ID and the colloquy ID for reference. In response, the viewer module creates a separate viewer context devoted entirely to monitoring the selected colloquy.

Next, the viewer sends a JoinColloquy command to the server context for that colloquy along with the user ID of the viewer user. The server context then stores that user ID as an active viewer of the colloquy. The server responds with a ColloquyHistory command directed towards the viewer context. With the ColloquyHistory message, the server context lists the history items for that colloquy, such as the time and date of when any expectations have been met.

At this time, the colloquy context also issues a TaskStatus message. The TaskStatus message provides the important data regarding each task in the current colloquy that has a particular status. This includes: the colloquy ID, a task ID, the task status (which is one of: active, completed, or sub-policy), short description, long description, a form description of the form in which to put collateral data regarding the colloquy, a list of user IDs that can take action on the task (i.e. the responsible users), and a list of the actions that can be taken by the users in the user ID lists (expectations).

Figure 9:
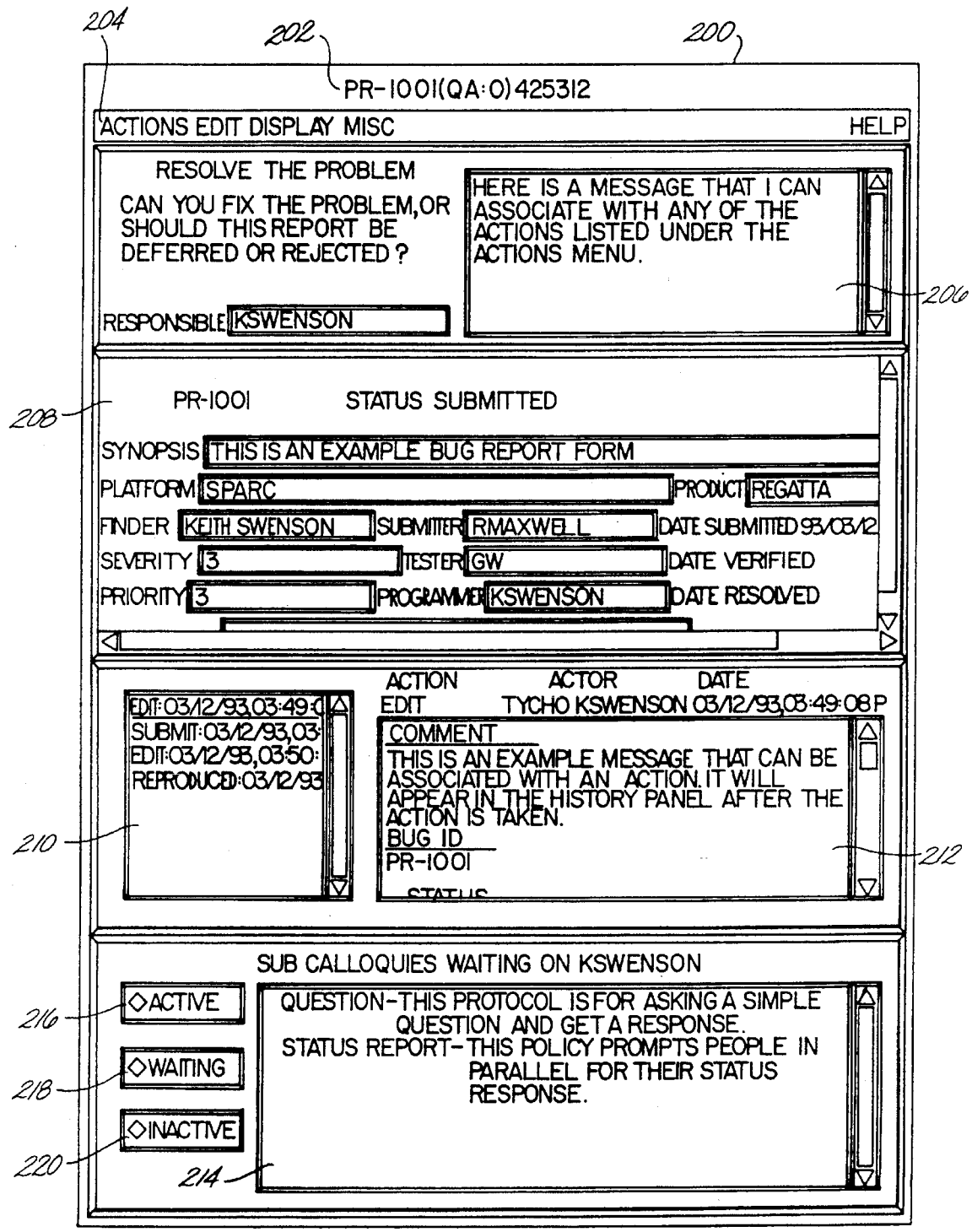
FIG. 9 is a view of a screen created by a viewer context module of the system shown in FIGS. 3 and 4.

The information broadcast over the TBus with the TaskStatus and ColloquyHistory messages is used by the viewer context to create a viewer context screen on the display of the viewer workstation, such as the example viewer context screen 200 shown in FIG. 9. The texts shown in windows 206–214 of the example viewer context screen 200 are just examples of the types of text that might appear in these windows and do not have significance beyond that. At the top of the screen, the label assigned to the colloquy, the colloquy ID 202 (e.g., "PR-1001(QA:O)425312") is shown. Pull-down menus bar 204 includes an Actions menu. The Actions menu includes the list of expected courses of actions (expectations) available to the responsible users.

Any comments associated with the actions listed in the Actions menu are listed in the action help window 206. Information that is collateral to the colloquy is shown using the form description in data window 208. The colloquy history data is shown in the history window 210. Each action taken in the course of the colloquy is listed, along with the user ID of the user performing the action and the date and time of the action. Any of the actions in the history window may be highlighted by a pointing device. The comment window 212 displays, any comments corresponding to the highlighted action in the history window and a list of any fields of the form that may have been updated when that action was taken.

The task list window 214 is used to list all of the tasks that have a particular status. The status of the tasks shown in the task list window is selected by selecting one of the active 216, waiting 218 or inactive 220 buttons. Tasks for which the user using the viewer is responsible for appear with an asterisk (not shown) in front of the name of the task. Any task in the task list window may be viewed using the rest of the windows and menus 202–212 of the viewer context screen by selecting the task from the task list window with a pointing device.

The server context generates the information passed to the viewer context by traversing the colloquy tree for the colloquy being maintained by the server context. The server context merely performs a methodical traverse of all of the agents in the tree to find all agents that have the desired status. The information for each of the tasks with the desired status is located within the tasks themselves. Thus, in providing the task data on a particular task, the server context does not have to refer to any other part of the colloquy.

When the user is ready to take an action on a task, the task is selected from the task list window 214 if it is not already being displayed on the windows and menus 202–212 of the viewer context screen. The Action menu is pulled down from the menu bar 204, displaying the possible expectations and the accept, decline and sub-plan options discussed above. The desired action is then selected from the Action menu. When an expectation is selected, the viewer context sends a message to the server context indicating that an action has been taken. The server context then deactivates the current agent, consults the action table of the current agent for the expectation of the action taken and activates any agents pointed to by the obligation or obligations corresponding the expected action. Activation of these new agents is followed by sending messages to all of the viewer contexts indicating the owners and expectation of the new agents.

This description of how the server and viewer communicate over the TBus illustrates the relationship of the viewer and the server. The viewer, in combination with the workstation is run on, is basically a smart terminal. It does not store any data regarding any colloquy except what is needed for display in the current window being displayed by the viewer or the viewer context. On the other hand, the server and server context contain all of the data and logic for a colloquy. The central location of this data an logic makes it feasible to keep track of on the fly modifications of a policy. In order to allow on the fly modifications, it is very helpful if all of the data and logic for the policy are located only in one location. This avoids the potential for different versions of the same policy on the system at once. It further simplifies the communication between the viewer and the server. If the data and logic for a policy are always in one place, no overhead programming is needed to search through many other viewers or other servers for the data and logic of the policy.

This architecture also emphasizes the feature that the system does not route information regarding the process to the person that is to perform the next task. Instead, all information regarding the completion of a stage and the activation of another stage is sent to and controlled by a server context. This allows any user in the group performing the process to get an up to date report on the status and complete history of a project. Further, with different levels of plans and sub-plans, a user, such as a top level executive that is only responsible for stages at the very top level of the process can easily limit the user's view of the process to meaningful level by only viewing the process down to the lowest level of sub-plan in which a stage with the user's responsibility is contained.

FIGS. 10–18 show alternative sub-plans 220, 230, 240, 262, 280, 304, 328, 340, and 352 for the Can Problem be Reproduced stage 44 shown in FIGS. 2a and 6. Since the Can Problem be Reproduced stage 44 is the responsibility of the Test Lead 44c, each sub-plan for this stage shown in FIGS. 10–18 is also the responsibility of the Test Lead. Text showing this information can be seen in the title lines 222, 232, 242, 264, 282, 306, 330, 342, 354 of FIGS. 10–18. Since the Test Lead is responsible for these sub-plans, the Test Lead is the only user that is able to create and modify these sub-plans. Each alternative sub-plan shows a different type of stage or a different way of linking stages. All of the different types of stages shown in FIGS. 10–18 and described below are implemented in the system with C++ objects. More specifically, they are all Active Agents. The differences between the different types of stages are implemented in the logic in the expectation/obligation table of the agent representing the stage.

Figure 10:
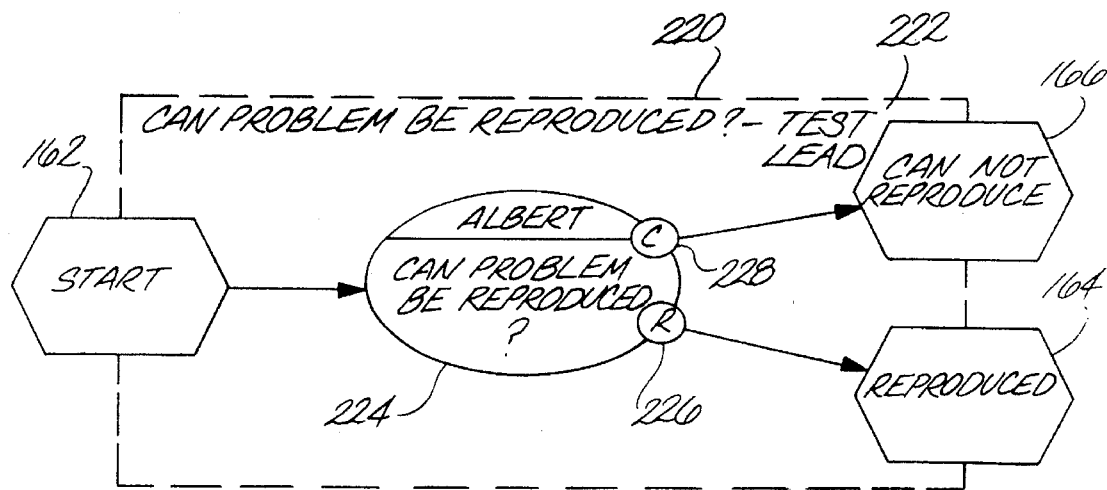
FIG. 10 is a work process diagram of a sub-plan showing delegation of an identical task created according to an embodiment of the invention.

FIG. 10 shows a sub-plan in which the Test Lead delegates the Can Problem Be Reproduced task to a specific tester, Albert. Thus, stage 224 is the same as stage 44 except that Albert is shown in the top of the oval instead of the Test Lead. Thus, the agent representing stage 224 will contain much of the same information as the agent representing stage 44 except that the obligations leading from the expectations 228, 226 of stage 224 point to the expectations 166, 164 of stage 44 instead of pointing directly to the next stages, stages 42 and 46, respectively of FIGS. 2a and 6.

Figure 11:
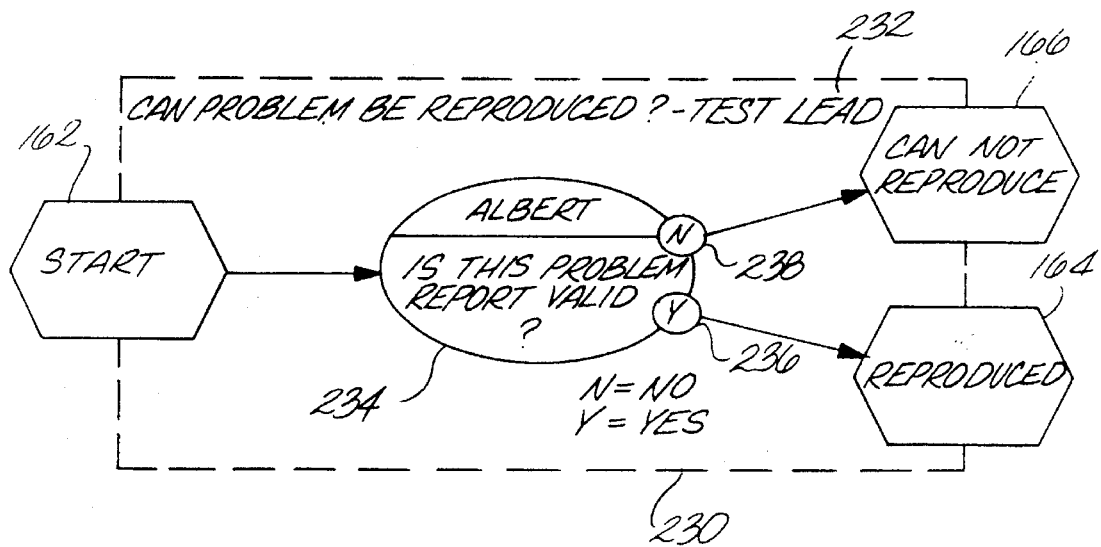
FIG. 11 is a work process diagram of a sub-plan showing rephrasing and delegation of a task created according to an embodiment of the invention.

FIG. 11 shows a sub-plan in which the Test Lead not only delegates the Can Problem Be Reproduced to a specific tester, Albert, but also rephrases the task into a yes or no question. This is done by introducing an agent 234 with a short title of "Is This Problem Report Valid?" and expectations of Y (Yes) 236 and N (No) 238. If a problem report is valid, the bug in the report can be reproduced, and if a problem report is not valid, the bug in the report cannot be reproduced. Thus, there is no practical difference between the sub-plans shown in FIGS. 10 and 11. Yet, the Test Lead may find the difference in wording helpful to certain of his testers and thus very useful.

FIG. 12 shows the stage of determining if a problem can be reproduced into three separate sub-tasks, performed serially by three different testers. The three sub-tasks are determining if the correct equipment is on hand 244, if sample data can be loaded on the equipment 250 and if the problem reported is valid 256. If any of these sub-tasks result in a negative determination, the problem can not be reproduced and a Can Not Reproduce expectation from the sub-plan should be returned. The sub-tasks are represented by stages Do We Have Equipment 244, which has expectations Y (Yes) 246 and N (No) 248, Can Sample Data Be Installed 250, which has expectations Y (Yes) 254 and N (No) 252 and Is This Problem Valid? 256, which has expectations Y (Yes) 258 and N (No) 260. As seen from the upper portion of the oval of stage 244, Bob is responsible for the Do We Have Equipment sub-task. If the expectation No occurs, the arrow (obligation) from circle N 248 corresponding to the No expectation is followed to the Can Not Reproduce expectation 166. In such a case, it is noted that stages 250 and 256 never get activated before the sub-plan has been completed. If the expectation Yes occurs, the arrow from circle Y 246 corresponding to the Yes expectation is followed to the Can Sample Data Be Installed stage 250, which then becomes active.

FIG. 13 shows a sub-plan 262 in which two stages are simultaneously activated and where both stages must be completed before one of the expectations of the sub-plan can be met. First, it is noted that the start node 162 has two arrow coming off of it, which represent to obligations that are created when the start node is activated. One arrow points to the Is Problem Valid in Unix stage 266 while the other arrow points to the Is Problem Valid in MS Windows stage 274. Thus, when the start node is activated, the stages referred to by the obligations (arrows) are both activated. It is further noted that the N (No) expectations 270 and 278 of the stages 266 and 274, respectively, both point to an AND stage 272. An AND stage is a partially predefined active agent represented by a special graphic symbol in the visual programming language. The AND agent has one expectation (which can have multiple obligations, if necessary). This expectation is met only when all of the expectations corresponding to the obligations leading to the AND stage are met and send activate signals to the AND agent. In the sub-plan shown in FIG. 13, the placement of the AND stage makes sense because it can only be said that a problem cannot be reproduced if it can neither be reproduced in UNIX nor MS Windows.

Figure 14:
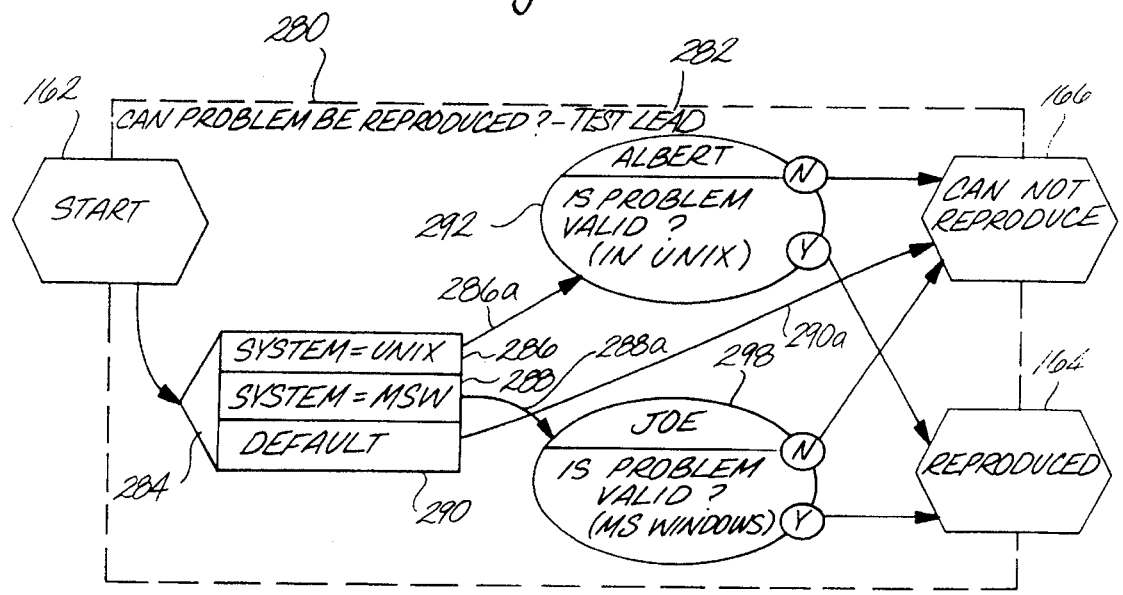
FIG. 14 is a work process diagram of a sub-plan showing conditional branching before delegation created according to an embodiment of the invention.

FIG. 14 shows a sub-plan 280 with conditional branching. More particularly, the sub-plan in FIG. 14 shows a conditional branch stage 284 that has three conditions 286, 288 and 290 that are met dependant only on the values of particular variables. Like the AND stage shown in FIG. 13, the conditional branch stage 284 is a partially predefined active agent. More particularly, a conditional stage is a stage which has obligations, each associated with a conditional statement, such as "Does the variable 'SYSTEM' equal 'UNIX'?" The different answers to the question are then the expectations of the conditional stage. In the case of conditional stage 284, the expected values of SYSTEM (representing the type of system on which the problem is reported to be) are UNIX, MSW (MS Windows) and DEFAULT (all other values for SYSTEM). Thus, the expectations for the conditional stage 284 are SYSTEM=UNIX 286, SYSTEM= MSW 288 and DEFAULT 290. As with any other stage, each of these expectations has an obligation that activates another stage. In this case, the obligations 286a, 288a, and 290a from expectations 286, 288 and 290 activate stages 292, 298 and 166 respectively. Finally, like the AND stage, conditional stages are represented by special graphical symbols in the visual programming language, as shown in FIG. 14.

Figure 15:
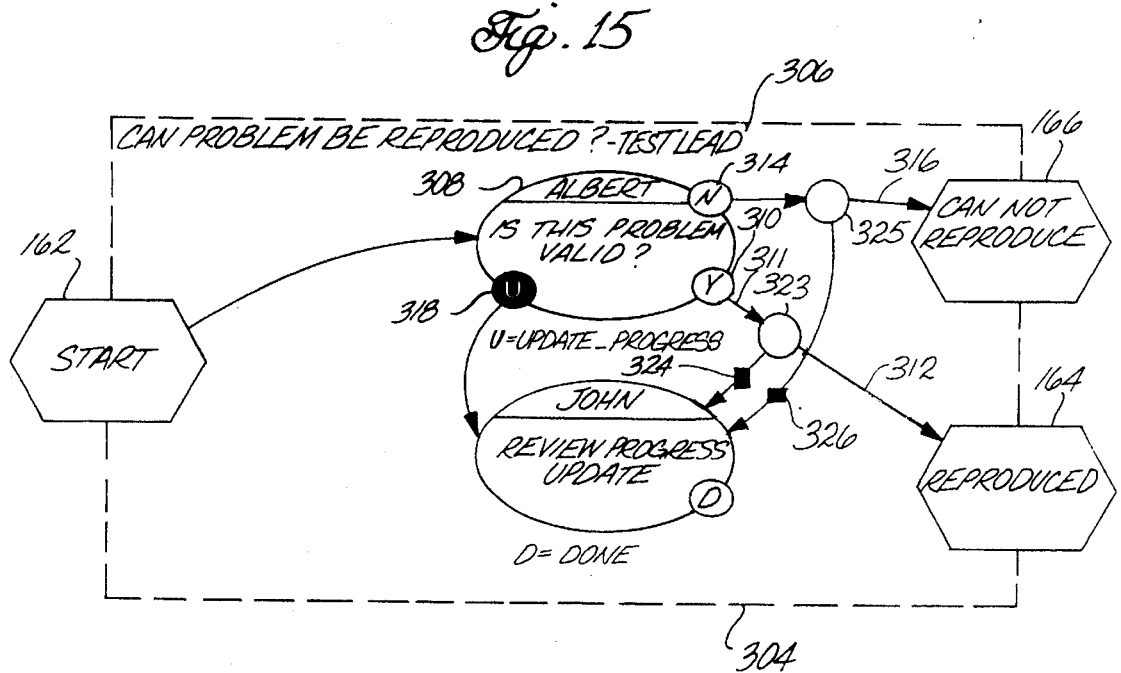
FIG. 15 is a work process diagram of a sub-plan showing delegation of a task with review of the task by the delegator created according to an embodiment of the invention.

FIG. 15 shows the work process diagram for a sub-plan representing the delegation of a task with review by a supervisor. This sub-plan introduces a new type of stage, the program node, and new types of expectations and obligations. In the discussion above, it was explained that expectations are normally represented by a small hollow circle with a letter in it on the surface of a stage oval and that obligations are normally represented by simple arrows pointing to other stages or end nodes.

When a normal expectation of a stage is met, that stage is deactivated and triggers the activation of the stage or node pointed to by the obligation. However, when an expectation of a stage is met, but the stage should not be deactivated, the small circle on the stage oval representing the expectation is filled in and the letter in it is hollow. Such a remain active expectation is the U expectation 318 of the Is This Problem Valid? stage 308.

Stages 323 and 325 are a different type of stage called a program node. A program node is a type of stage that does not have expectation, but does have obligations. Instead of having expectations, the program node follows some predetermined logic in fulfilling obligations. Thus, program nodes do not have responsible users. The simplest type of program, such as program nodes 323 and 325 are represented by hollow circles that are separate from other stages. This type of program node automatically fulfills all of its obligations, such as obligations 324 and 312 for program node 323 and obligations 326 and 316 for program node 325 as soon as it is activated. This type of stage is needed because in ordinary stages, an expectation can only be paired with one obligation. In an alternative embodiment, the combination of an expectation with an obligation to a program node which in turn has multiple obligations can be represented by the visual programming language as simply an expectation with multiple obligations. There are also other types of program nodes that fulfill their obligations based on other predetermined criteria. Conditional stages (e.g., stage 284 in FIG. 14) and timer stages (e.g., stage 362 in FIG. 18) are both types of program nodes, programmed to fulfill obligations based on different criteria.

When a normal obligation is undertaken, because its corresponding expectation was met, the stage or node pointed at by the arrow representing the obligation is activated. However, when a obligation is to deactivate the stage or node pointed at by the arrow representing the obligation, the arrow has a filled in box at some point along the shaft of the arrow. Such deactivation obligations are obligations 324 and 326 leading from expectations Y 310 and N 314, respectively.

Figure 16:
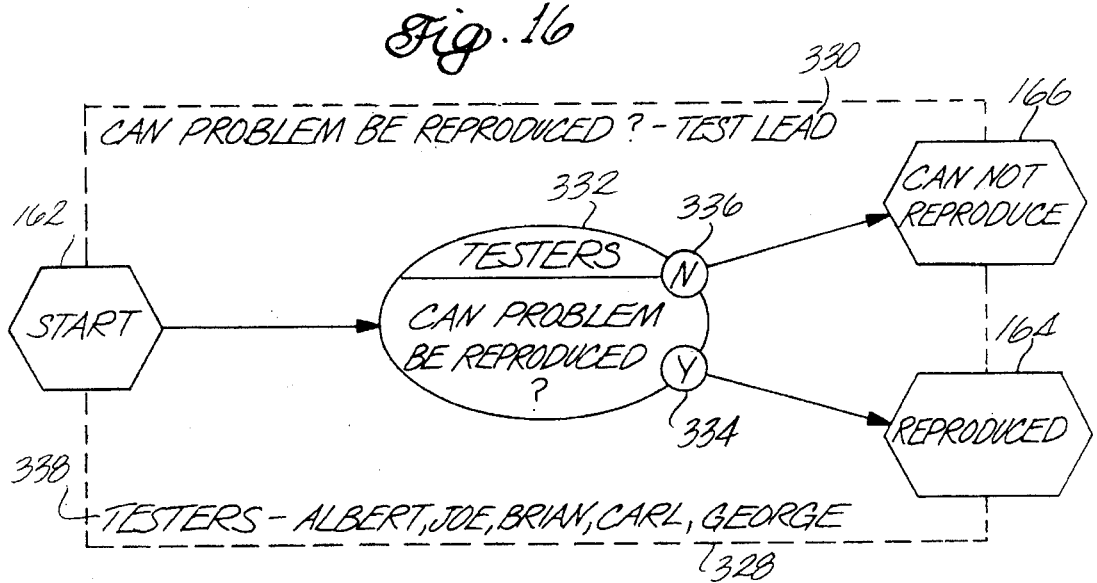
FIG. 16 is a work process diagram of a sub-plan showing assignment of a task to anyone within a group of users created according to an embodiment of the invention.

FIG. 16 shows a sub-plan in which a task is delegated any one of a group of users. This is represented in the visual programming language by a non-user name appearing as the responsible user for a stage and a list of users following the non-user name appearing at the bottom of the sub-plan screen. In the sub-plan shown in FIG. 16, "Testers" is shown as the responsible user for the Can Problem Be Reproduced? stage 332. The user list 338 for the term "Testers" that appears at the bottom of the sub-plan in FIG. 16 appears in a pop-up menu in the preferred embodiment. When this type of stage is activated, it appears on the activate stage list for every user in the user list. However, as soon as one user meets one the expectations 334, 336 of the stage, the stage is deactivated as to everyone in the user list since the task of the stage need only be performed once.

Figure 17:
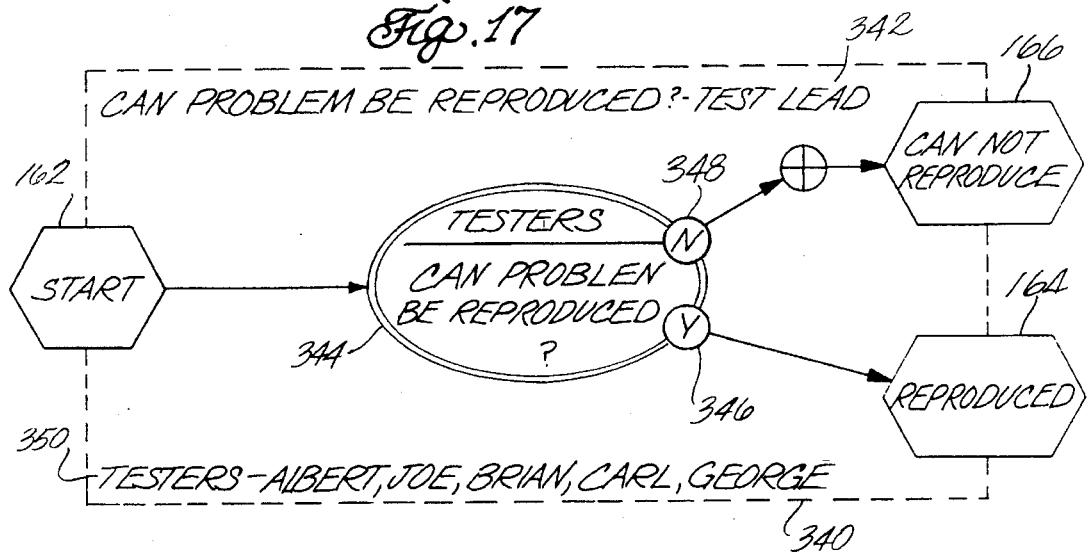
FIG. 17 is a work process diagram of a sub-plan showing assignment of the same task to every member of a group of users created according to an embodiment of the invention.

FIG. 17 shows the delegation of a task to a group of users, each of whom must separately complete the task. The Can Problem Be Reproduced? stage 344 is a stage representing such a delegation and is represented in the visual programming language as an oval drawn with double lines, a non-user shown as the responsible user and a list of users 350 following the non-user name shown appearing at the bottom of the plan or sub-plan in FIG. 17, but appearing in a pop-up menu in the preferred embodiment. With this type of stage, if Albert meets an expectation 346, 348 of the stage, the stage is deactivated with respect to Albert but remains activated with respect to the other users on the "Testers" list 350.

Figure 18:
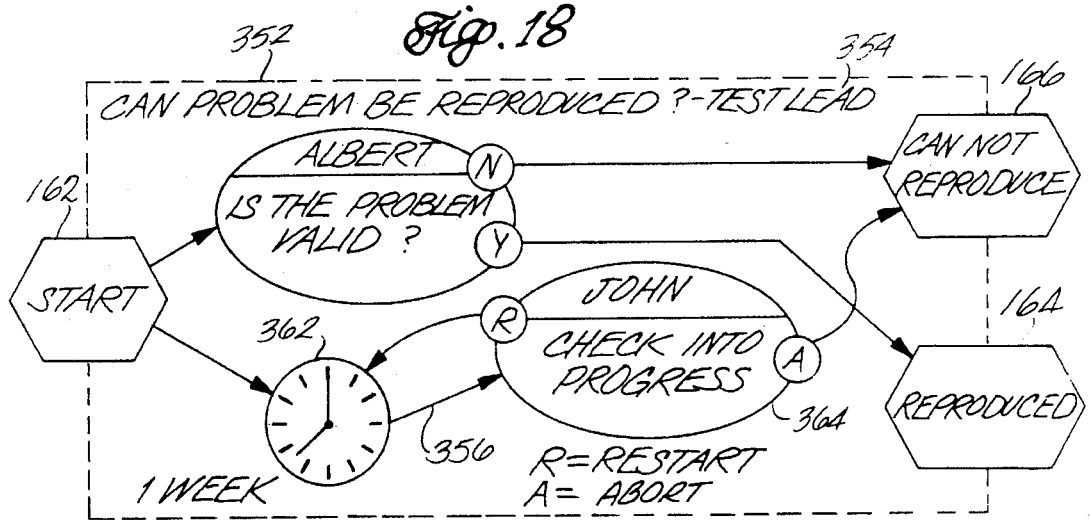
FIG. 18 is a work process diagram of a sub-plan showing delegation with delayed review created according to an embodiment of the invention.

FIG. 18 shows a sub-plan with a delay stage. Delay stage 362 is a partially predefined program node shown in the visual programming language as the face of a clock with a single arrow (obligation) 356 leading out of the stage. A delay stage consists of a stage for answering the question "Has ___ amount of time past since activation of this stage?" When the answer to this question is "yes," the obligation of the stage is fulfilled, activating the stage (e.g. 364) pointed to by the obligation.

Figure 19:
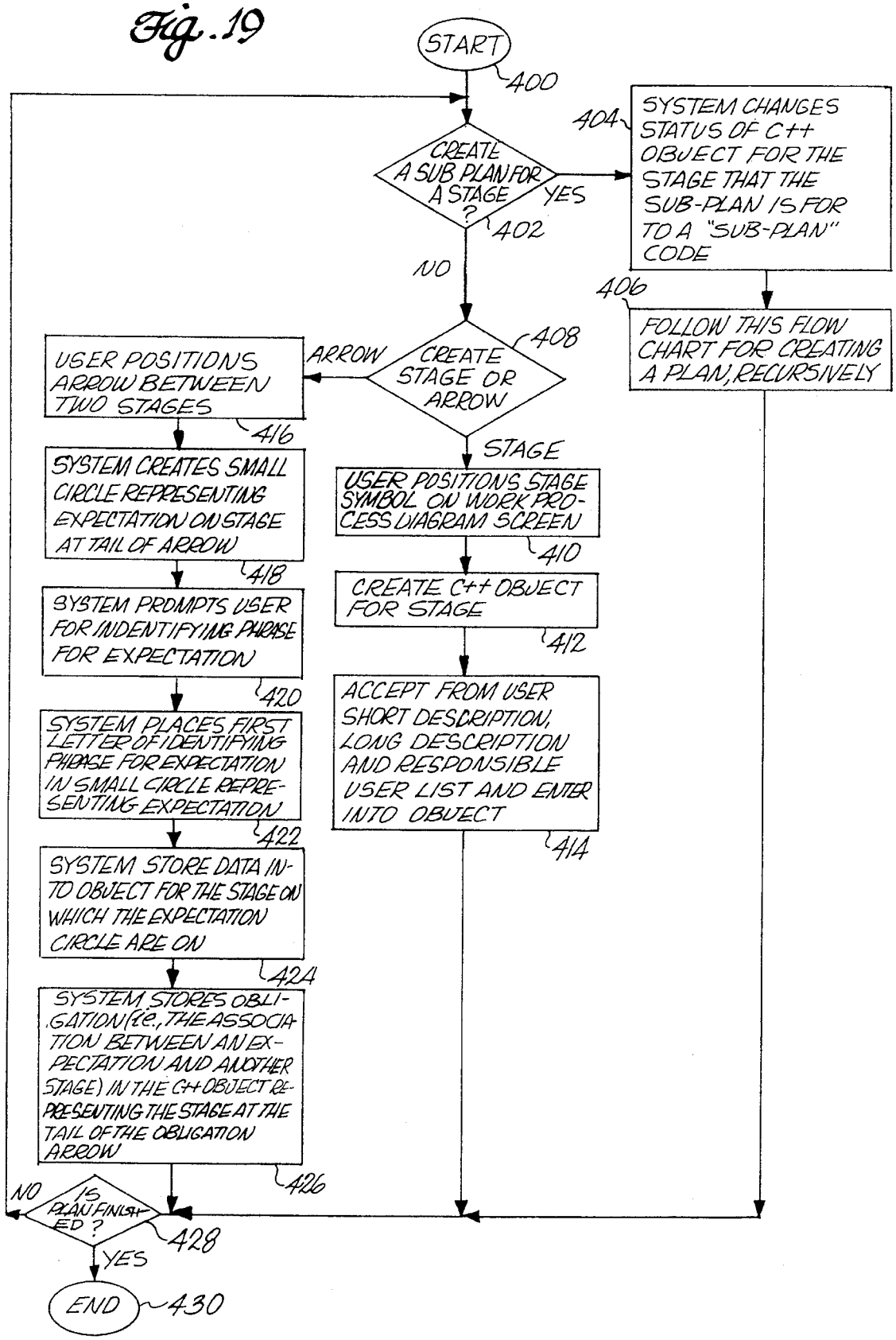
FIG. 19 is a flow diagram showing the creation of a work process plan using the system shown in FIGS. 3 and 4.

FIG. 19 is a flow diagram showing the creation of a work process plan using the visual programming module of the present system. In general, the visual programming module allows a user to use a visual programming language, consisting of the symbols and text shown in and described with reference to FIGS. 2, 2a and 10–18 to create a graphical diagram representing a work process model. The visual programming module then communicates data concerning to the stages of the work process model shown in the graphical diagram to a colloquy context module which is running for the work process model being modified or is initiated by the server module if the work process model is being created. The colloquy context then converts the data received from the visual programming module into agents as described with reference to Table 1 and puts the agents into the tree structure shown in FIG. 5. Thus, throughout the discussion of the flow diagram shown in FIG. 19, all of the blocks that involve the user providing input into the system are performed by a visual programming module and all of the blocks that involve the creation or modification of any agent (C++ objects) are performed by a colloquy context. Some blocks are partially performed by a visual programming module and a colloquy context. The type of module, that performs a particular block is noted following the reference number for the block below by "VPM" for a visual programming module and "CCM" for a colloquy context module. For those blocks which involve the user making a decision, the "VPM" notation is used as the results of these decisions are input into the system through the visual programming module.

The user begins creating a work process plan at the start block 400 (VPM) using the data entry units of workstations 84a, 86a or 88a. Although at first there are no stages in the user's work process plan, once stages have been created, the user, in block 402 (VPM) decides whether to create a new stage or create a sub-plan for an existing stage. If the user decides to create a sub-plan for an existing stage, in block 404 (CCM), the system creates a C++ object of the "Policy" class (see discussion regarding FIG. 5), assigns a label to the object stored in "RWCString name" of the "Policy" object and also stores this label in RWCString hsubpolicy 459 of the agent representing the stage to sub-plan and recursively starts a new process, in block 406 (CCM), for creating a work process as shown in FIG. 16. The only difference between the process for creating a sub-plan and a plan is that the plan has one start node (e.g., 74) and one end node (e.g., 51) (FIG. 2), while the sub-plan has one start node (e.g., 162) and an end node for each of the expectation for the stage for which the sub-plan is being created (FIG. 2a). When creation of the sub-plan is completed, control returns to the flow diagram shown in FIG. 16 at the exit of block 406.

If the user does not wish to create a sub-plan for an existing stage in block 402, the user has the option, in block 408 (VPM) of creating a stage or an arrow, representing an expectation and an obligation. If the user chooses to create a stage, in block 410 (VPM), the user positions a stage symbol, such as oval 46, somewhere on the representation of the work process diagram on the display of the user's workstation. When the symbol for a stage is positioned, in block 412 (CCM), the colloquy context creates a VplActiveAgent C++ object (agent), such as that described in reference to Table 1, representing the stage. The system assigns an identifying "event$_{13}$number" 452 to the agent. The system also updates the list of pointers to agents in the Policy class object for the plan that the contains the stage being created and stores a pointer to this Policy class object in the Policy *policy of the agent representing the stage being created.

In block 414 (VPM, CCM), the system prompts for and accepts from the user, a short description of the stage, such as "Can the Problem be Fixed? 46a, a long description of the stage that appears on the viewer context screen (e.g., "Can you fix the problem, or should this report be deferred or rejected?" in FIG. 9), and the user or users responsible for the stage, such as Programmer 46b. The short description is stored in ShortDescription 460, the long description is stored in LongDescription 462 and the user or users responsible for the stage is stored in *Groups 464.

After the stage has been created in blocks 410–414, the user can inform the system that the user is finished with the plan, in block 428 (VPM). If the user is finished, the process of creating the plan ends in block 430 (VPM, CCM) and the representation of the plan in the colloquy context is stored for later use and the running of the visual programming module is terminated. If the user is not finished, block 402 is repeated.

If the user elects, in block 408, to create an arrow the user, in block 416 (VPM), positions the arrow, such as arrow 60a, between two stages, with the tails of the arrow on the stage, such as stage 46 for arrow 60a, where the expectation associated with the arrow should be on, and the point of the arrow resting on the stage, such as stage 50 for arrow 60a, that is to be activated when the obligation is fulfilled. The arrow is positioned by the user dragging, using a pointing device, the tail of the arrow onto one stage and dragging the point of the arrow onto another stage. In block 418 (VPM), the system draws a small circle, such as circle 60 for arrow 60a representing the expectation associated with the arrow, on the stage, such as stage 46, at the tail of the arrow where the arrow meets the stage. In block 420 (VPM), the system then prompts for and accepts from the user, an identifying phrase for the expectation such as "F=Resolve$_{13}$Fixed" 79 for the expectation represented by circle 60. In block 422 (VPM) the system places the first letter of the accepted identifying phrase in the small circle, such as circle 60, representing the expectation. In block 424 (CCM), the system creates the expectation object for the expectation associated with the arrow, stores the identifying phrase into this expectation object, and stores a pointer to this expectation object in the agent for the stage on which the circle was placed, such as the agent for stage 46 for circle 60, into RWSet *Expectations 456. In block 426 (CCM), the system creates the obligation object for the obligation represented by the arrow and stores a pointer to this obligation object in the agent for the stage at the tail of the arrow, such as the agent for stage 46 for arrow 60a, into RWSet *Obligations 458. Also in this block, the system assigns an obligation id token to the obligation and stores this token in the RWCString OToken variable in both the expectation object and the obligation object. Finally, in block 426, the system stores a pointer to the stage pointed to by the arrow (e.g., stage 50) into VPLAgent *Agent of the obligation object.

Thus, through the creation of stages and arrows (expectations and obligations) using the visual programming language to create a work process plan such as that shown in FIGS. 2, 2a, 6 and 10–18, according to the flow diagram shown in FIG. 19, an object that is stored in the tree structure shown in FIG. 5 is created by the system and contains the critical information stored in the data declarations shown in Table 1.

Figure 20:
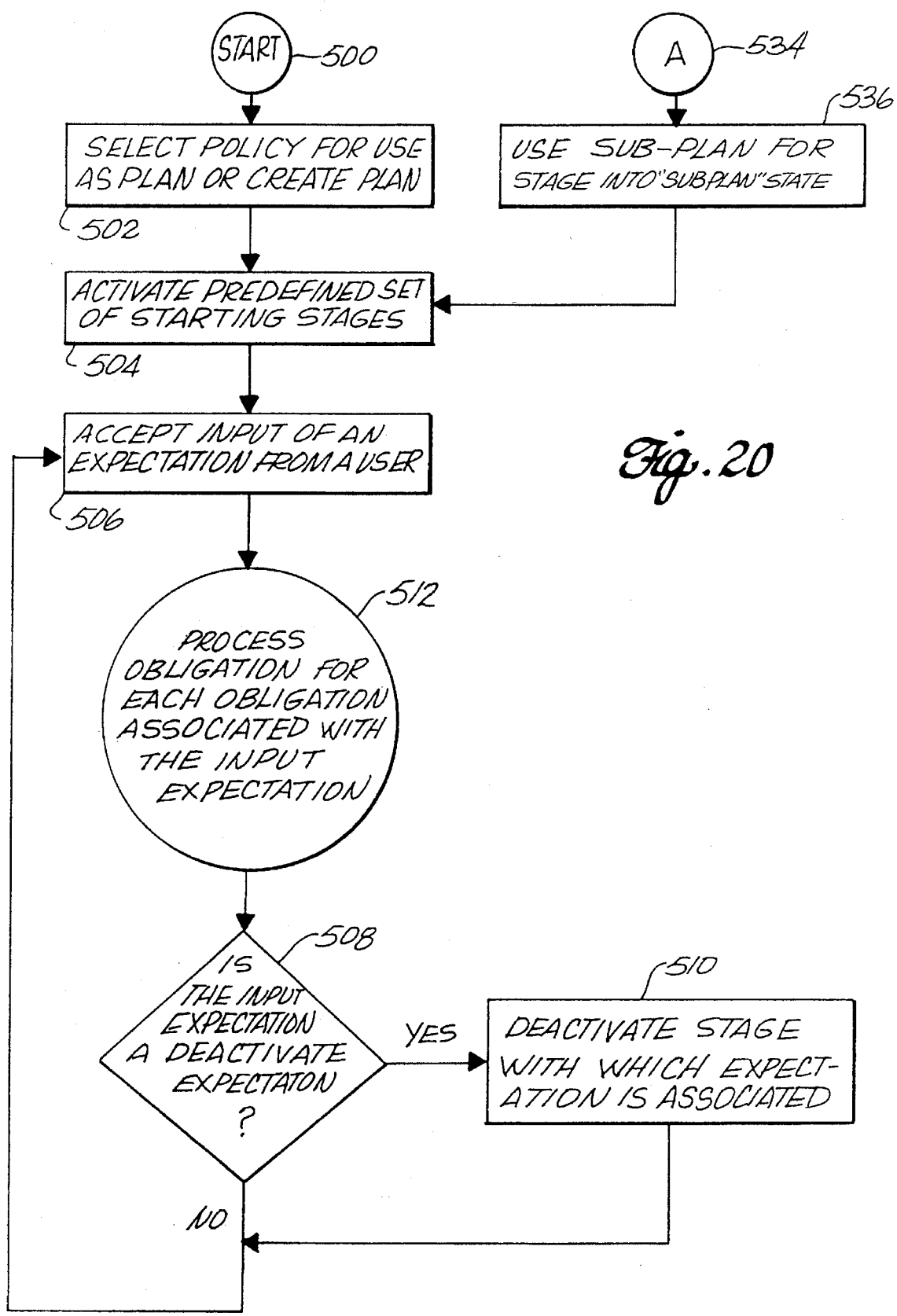
FIG. 20 is a flow diagram showing the execution of a work process diagram such as that shown in FIGS. 2, 2a, 6 and 10–18 using the system shown in FIGS. 3 and 4.
Figure 21:
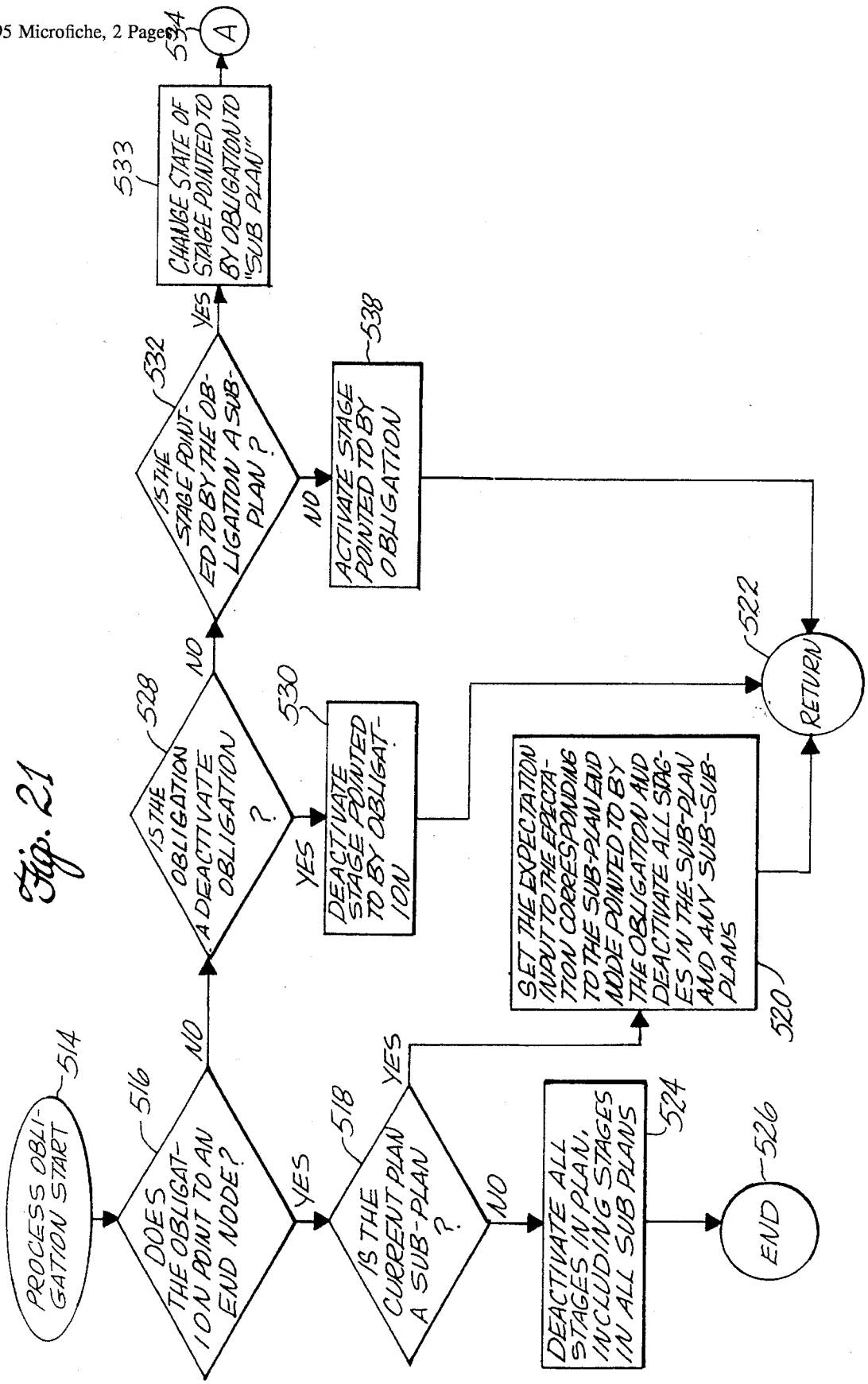
FIG. 21 is a flow diagram of a sub-process for performing the step shown in block 512 of FIG. 20.

FIGS. 20 and 21 show a flow diagram for tracking the execution of a work process by the system shown in FIGS. 3 and 4 that begins in block 500. The functions represented by all of the blocks in FIGS. 20 and 21 are all performed by a colloquy context, except blocks 502 and 506 which involve user input which is performed in a viewer module or a viewer context module. In block 502, the user either selects a predefined policy for use as a plan for accomplishing the work process or creates a new plan for accomplishing the work process. This selection of a policy or creation of a new plan is described above in reference to FIGS. 7 and 8 and the visual programming module described in reference to FIG. 19.

In block 504, after a policy has been selected for use as a plan or a new plan is created, the system consults the start node obligations for the plan and activates any agents pointed to by these obligations. Next, in block 506, the system accepts the input of a user from a data entry unit of a workstation indicating that one of the expectations of one of the active agents has been selected as being completed. This is done through the use of the Actions menu 204 of a viewer context as shown in and described in reference to FIG. 9.

In block 512, each obligation associated with the selected expectation is processed. Block 512 represents a sub-process that is followed in processing obligations. Since there may be multiple obligations for a single selected expectation, block 512 represents the multiple execution of this sub-process.

The sub-process performed in block 512 is shown in more detail as the process shown in FIG. 21. It is noted at this time, however, that after all of the obligations are processed in block 512, block 506 is repeated unless the execution of the work process plan was ended 526 in the sub-process for block 512 shown in FIG. 21.

Processing an obligation begins in block 514. Next, in block 516, the system determines if the obligation points to an end node.

If the obligation being processed points to an end node, the system, in block 518, determines if current plan being executed is itself a sub-plan of another plan (the parent plan). If not, the root colloquy is being processed and the activation of the end node of a root colloquy (e.g., end node 51 for the Quality Assurance Plan project) signifies the completion of the project. The system deactivates all of the agents in the plan, including the stages in any sub-plans by setting the int status 450 (Table 1) for every agent in the plan to inactive in block 524. The process of tracking the work process model then ends in block 526 and the running of the colloquy context module for that work process model is terminated.

If the plan currently being executed is a sub-plan, the system then terminates the execution of the sub-plan by setting the int status 450 for every agent in the sub-plan to inactive and thus deactivating all agents in the sub-plan in block 520. For the agent in the parent plan that is represented by the sub-plan, the system also selects the expectation of that agent that corresponds to the end node that is pointed to by the obligation being processed. Control is then returned to the flow diagram shown in FIG. 20 at block 506 (the block following block 512), where the system selected expectation is used instead of a user selected expectation.

If the obligation being processed at block 516 does not point to an end node, the system determines, in block 528, if the obligation is a deactivate obligation, such as obligations 324 and 326 shown in FIG. 15, rather than the typical obligation, such as obligation 60a. If the obligation is a deactivate obligation, the status 450 of the agent that is pointed to by the obligation is changed to inactive in block 530. Control is then returned, at block 522, to the process shown in FIG. 20, at block 508.

If, at block 528, it is determined that the obligation being processed is not a deactivate obligation, the system then determines, in block 532, whether the agent pointed to by the obligation represents a sub-plan by checking the int status 450 of that agent. If that agent represents a sub-plan, such as the agent representing stage 44 in FIGS. 2a and 6, the state of the stage pointed to by the obligation is changed to "sub-plans", in block 533, and a new process as shown in FIG. 20 is started, in block 534, for the sub-plan, except that instead of the user selecting a policy or creating a plan in block 502, the system automatically uses, in block 536, the sub-plan as the plan being executed. This process for the sub-plan is followed simultaneously with the process being followed for the plan containing the agent representing the sub-plan.

If, in block 532, the system determines that the obligation does not point to an agent representing a sub-plan, the system changes the int status 450 of that agent to active in block 538, and control is returned at block 522 to the process shown in FIG. 20, at block 508.

In block 508, the system determines if the expectation associated with the obligation just processed is the normal deactivate expectation, shown in FIGS. 2, 2a, 6 and 10–18 as a hollow circle (e.g., circle 60), rather than a remain active expectation, such as the U expectation 318 shown in FIG. 15. If the expectation is a deactivate expectation, the agent which contains the expectation is deactivated in block 510. After block 510, or if the expectation was found not to be a deactivate expectation in block 508, control is returned to block 506.

Following the process shown in FIGS. 20 and 21, the system keeps track of a plan by activating and deactivating agents according to the work process plan being executed and the expectations selected by the users, signifying the completion of task within the process or the answering of questions. When the agents of a work process plan are being thus activated and deactivated according to the work process plan, the viewer, as described in reference to FIG. 9 can accurately track the execution of the work process in real time.

It is thought that the method and system for modelling, analyzing and executing work process plans of the present invention and many of its attendant features will be understood from the foregoing description and it will be apparent that various changes may be made in the form, construction and arrangement of the parts and steps thereof without departing from the spirit and scope of the invention or sacrificing all of its material advantages, the form hereinbefore described being merely a preferred or exemplary embodiment thereof. It is therefore to be understood that because various other embodiments may be devised by those skilled in the art without departing from the spirit and scope of the invention, it is the invention of the inventor to be limited only by the claims appended hereto.

TABLE 1

EXCERPTS FROM DATA DECLARATIONS OF
VPLAGENT AND VPLACTIVEAGENT CLASSES
(numbers appearing in left column are reference
numerals, not line numbers contained in the program)

```
      class VplActiveAgent : public VplAgent
      {
            private:
450         int status;
452         static long event_number;

protected:
454         RWSet *Obligations;
456         RWSet *Expectations;
              .
              .
              .
459         RWCString hSubPolicy;
              .
              .
              .

class VplAgent : public RWCollectable
      {
            private:
460         RWCString ShortDescription;
462         RWCString LongDescription;
              .
              .
              .
463         Policy *policy
              .
              .
              .
464         protected:
466           .
468           .
470           .
              RWSet * Groups;
              RWCString Prologue_Tcl;
              RWCString Body_Tcl;
              RWCString Epilogue_Tcl;
              .
              .
              .
```

What is claimed is:

1. The method of, utilizing a computer for, modelling a work process to form a work process model, comprising a plurality of stages that may either be activated or deactivated, that allows dynamic modification of the work process model comprising the step of:

creating representations defining a plurality of said stages, comprising the steps of:

for each of said stages, creating representations defining a set of expected courses of action that may be performed in completing the stage;

for each of said expected courses of action, creating representations associating one or more obligations that must be fulfilled upon the performance of such expected course of action; and creating representations relating each of said obligations with one or said stages that is to be activated when said obligation is so fulfilled;

tracking the activation and deactivation of said stages; and after the step of tracking has begun, modifying one or more of said representations defining a plurality of stages, representations defining sets of expected courses of action or said representations associating one or more obligations.

2. The method of claim 1 wherein said step of creating representations defining a plurality of stages comprises the step of:

creating representations defining a plurality of stages, wherein each of said stages represents a task to be performed or a question to be answered by a user.

3. The method of claim 1 further comprising the step of:

for at least one of said stages, creating representations defining an associated further plurality of stages, each stage with a set of expected courses of action that may be performed in completing the stage and one or more obligations, each obligation associated with an expected course of action, to be fulfilled upon the performance of the associated course of action so that the further plurality of stages, taken as a whole, has the same expected courses of action as its associated stage.

4. The method of claim 1 further comprising the step of:

creating representations defining one of said stages having an AND function and having a plurality of obligations associated with the activation of said one of said stages, which has a single expected course of action of being activated by all of said obligations associated with the activation of said one of said stages.

5. The method of claim 1 further comprising the step of:

creating representations defining one of said stages as a conditional branch stage which has a plurality of expected courses of action and further, for each such expected course of action, the step of creating representations defining such courses of action as courses of action of defined variables having defined relations with defined constants.

6. The method of claim 1 wherein said step of creating representations relating each of said obligations comprises the steps of:

creating representations relating each of a plurality of said obligations with one of said stages that is to be activated when said each of a plurality of said obligations is so fulfilled; and creating representations relating each of the remaining of said obligations with one of said stages that is to be deactivated when said obligation is so fulfilled.

7. The method of claim 1 further comprising the step of creating representations defining, for each of said stages, a user responsible for completing such a stage.

8. The method of claim 1 wherein said step of modifying comprises the step of:

performing one or more further of said steps of creating representations defining more of said stages, creating representations defining more sets of said expected courses of action or creating representations associating and relating more of said obligations.

9. The method of claim 1 wherein said step of tracking the activation and deactivation of said stages further comprises the step of:

beginning said step of tracking by activating a predefined set of one or more of said stages upon activation of the work process model.

10. The method of claim 1 wherein said step of tracking the activation and deactivation of said stages further comprises the step of:

accepting input from a user signifying that one of said expected courses of action defined for an active one of said stages has been performed;

deactivating said active one of said stages for which said one of said expected courses of action is defined; and activating the stages to be activated associated with the obligations associated with said one of said expected courses of action.

11. The method of claim 1 wherein said step of tracking the activation and deactivation of said stages further comprises the step of:

terminating said step of tracking when an end node stage is activated.

12. The method of any one of claims 1–7 or 11 wherein said step of creating representations defining a plurality of said stages comprises the step of:

creating representations defining a plurality of said stages utilizing a programmed computer system comprising a server workstation and a plurality of viewer workstations, said server workstation and said viewer workstations communicating via a bus.

13. The method of tracking the execution of a work process model, said work process model comprising a plurality of stages that may either be activated or deactivated, that allows dynamic modification of the work process model and said work process model further comprising representations defining a plurality of said stages, for each of said stages, representations defining a set of expected courses of action that may be performed in completing the stage, for each of said expected courses of action representations associating one or more obligations that must be fulfilled upon the performance of such expected course of action and representations relating each of said obligations with one of said stages that is to be activated when said obligation is so fulfilled, comprising the steps of:

activating a predefined set of one or more of said stages upon activation of the work process model;

accepting input signifying that one of said expected courses of action defined for an active one of said stages has been performed;

deactivating said active one of said stages for which said one of said expected courses of action is defined;

activating the stages to be activated associated with the obligations associated with said one of said expected courses of action; and modifying said work process model after activation of the work process model has occurred.

14. The method of claim 13 further comprising the step of:

terminating said step of tracking when an end node stage is activated.

15. A programmed computer system for modeling a work process to form a work process model, comprising a plurality of stages that are either active or inactive, that allows dynamic modification of the work process model, the programmed computer system comprising:

means for defining a plurality of said stages;

means for defining, for each of said stages, a set of expected courses of action that may be performed in completing the stage;

means for associating, for each of said expected courses of action, one or more obligations that must be fulfilled upon the performance of such expected course of action;

means for associating the obligations with one of said stages that is to be activated when said obligation is so fulfilled; and means for tracking the activation and deactivation of said stages, and after the step of tracking has begun, modifying one or more of said representations defining a plurality of stages, representations defining sets of expected courses of action or said representations associating one or more obligations.

16. The programmed computer system of claim 15 further comprising:

means for defining, for at least one of said stages, an associated further plurality of stages, each with a set of expected courses of action performed in completing the stage and one or more obligations, each associated with an expected course of action, to be fulfilled upon the performance of the associated course of action so that the further plurality of stages, taken as a whole, has the same expected courses of action as its associated stage.

17. The programmed computer system of claim 15 wherein said means for defining further comprises:

means for defining one of said stages, having a plurality of obligations associated with the activation of said one of said stages, which has a single expected course of action of being activated by all of said obligations associated with the activation of said one of said stages.

18. The programmed computer system of claim 15 wherein said means for defining further comprises:

means for defining a conditional branch stage which has a plurality of expected courses of action where each such expected course of action comprises a defined variable having a defined relation with a defined constant.

19. The programmed computer system of claim 1 wherein said means for associating obligations further comprises:

means for associating a plurality of the obligations with one of said stages that is to be activated when said obligation is so fulfilled; and means for associating each of the remaining of the obligations with one of said stages that is to be deactivated when said obligation is so fulfilled.

20. The programmed computer system of claim 15 further comprises means for defining, for each of said stages, a user responsible for completing such a stage.

21. The programmed computer system of claim 15 wherein said means for tracking the activation and deactivation of said stages further comprises:

means for activating a predefined set of one or more said stages upon activation of the work process model.

22. The programmed computer system of claim 15 wherein said means for tracking the activation and deactivation of said stages further comprises:

means for terminating said step of tracking when an end node stage is activated.

23. The programmed computer system of claim 15 further comprising:

a server computer workstation and a plurality of viewer computer workstations connected to said server workstation.

24. The programmed computer system of claim 15 wherein said means for modifying further comprises:

means for defining stages;

means for defining sets of expected courses of action;

means for associating obligations for expected courses of action; and means for associating obligations with one of said stages.

25. The programmed computer system of claim 15 wherein said means for tracking the activation and deactivation of said stages further comprises:

means for accepting input signifying that one of said expected courses of action defined for an active one of said stages has been performed;

means for deactivating said active one of said stages for which said one of said expected courses of action is defined; and means for activating the stages to be activated associated with the obligations associated with said one of said expected courses of action.

26. The programmed computer system of claim 25 further comprising a plurality of viewer computer workstations wherein at least one of said viewer computer workstations comprises said means for accepting input; and a server computer workstation, connected to said viewer computer workstations, comprising said means for deactivating and said means for activating.

* * * * *

UNITED STATES PATENT AND TRADEMARK OFFICE
CERTIFICATE OF CORRECTION

PATENT NO. : 5,490,097
DATED : February 6, 1996
INVENTOR(S) : Keith D. Swenson; Robin J. Maxwell Page 1 of 3

It is certified that error appears in the above-indentified patent and that said Letters Patent is hereby corrected as shown below:

ABSTRACT, line 3, after "modification" insert -- of --.

Column 3, line 11, change "representations" to
    -- representation --.
Column 3, line 35, change "plans'" to -- plan's --.

Column 6, lines 4,5, change "another stages generally mean that the stage being pointed to are" to
    -- another stage generally means that the stage being pointed to is --.
Column 6, line 54, after "responsible" insert -- for --.

Column 7, line 9, change "C=Can$_{13}$Not$_{13}$Reproduce" to
    -- C=Can_Not_Reproduce --.
Column 7, line 15, change "Can$_{13}$Not$_{13}$Reproduce" to
    -- Can_Not_Reproduce --.
Column 7, lines 28,31,34, change "by" to -- be --
    (all occurrences).
Column 7, lines 36,46, change "Can$_{13}$Not$_{13}$Reproduce" to
    -- Can_Not_Reproduce -- (both occurrences).

Column 8, line 6, change "C-Can't$_{13}$Reproduce" to
    -- C_Can't_Reproduce --.
Column 8, line 67, delete "and is".

UNITED STATES PATENT AND TRADEMARK OFFICE
CERTIFICATE OF CORRECTION

PATENT NO. : 5,490,097
DATED : February 6, 1996
INVENTOR(S) : Keith D. Swenson; Robin J. Maxwell It is certified that error appears in the above-indentified patent and that said Letters Patent is hereby corrected as shown below:

```
Column 9, line 2, delete "and is".
Column 9, line 2, change "Hewlett Packard)) 90" to
          -- Hewlett Packard) --.
Column 9, line 63, before "shown" delete "the".

Column 11, line 38, after "messages" insert -- and --.
Column 11, line 46, change "represent" to
          -- represents --.
Column 11, line 65, change "Prologue₁₃Tcl 466, Body₁₃Tcl 468
          and Epilogue₁₃Tcl" to -- Prologue_Tcl 466,
          Body_Tcl 468 and Epilogue_Tcl --.

Column 12, line 24, change "object" to -- objects --.
Column 12, line 46, after "pointer" insert -- to --.

Column 13, line 24, change "FIGS. 2 is be" to
          -- FIG. 2 is to be --.

Column 14, line 29, before "diagram" insert -- the --.

Column 15, line 48, change "detail" to -- detailed --.

Column 17, line 54, after "station" insert -- it --.
Column 17, line 59, after "data" change "an" to -- and --.

Column 19, line 17, change "arrow" to -- arrows --.
Column 19, line 18, change "to" to -- two --.

Column 20, line 37, change "a" to -- an --.
Column 20, line 43, after "delegated" insert -- to --.
Column 20, line 56, after "one" insert -- of --.
```

UNITED STATES PATENT AND TRADEMARK OFFICE
CERTIFICATE OF CORRECTION

PATENT NO. : 5,490,097
DATED : February 6, 1996
INVENTOR(S) : Keith D. Swenson; Robin J. Maxwell It is certified that error appears in the above-indentified patent and that said Letters Patent is hereby corrected as shown below:

Column 22, line 8, change "event$_{13}$number" to
-- event_number --.
Column 22, line 11, delete "the" (second occurrence).
Column 22, line 17, after "Fixed?" insert -- " --.
Column 22, lines 32,33, change "If the user elects, in block 408, to create an arrow the user, in block 416 (VPM), positions" to
-- If the user elects in block 408 to create an arrow, the user in block 416 (VPM) positions --.
Column 22, line 47, change "F=Resolve$_{13}$Fixed" to
-- F=Resolve_Fixed --.

Column 23, lines 33,34, change "sub- process" to
-- sub-process --.
Column 24, line 66, change "invention of the inventor" to
-- intention of the inventors --.
Column 28, line 28, change "1" to -- 15 --.

Signed and Sealed this

Fourth Day of March, 1997

BRUCE LEHMAN

*Attest:*

*Attesting Officer*           Commissioner of Patents and Trademarks